United States Patent
Woodgate et al.

[19]

[11] Patent Number: 5,808,792
[45] Date of Patent: Sep. 15, 1998

[54] AUTOSTEREOSCOPIC DISPLAY AND METHOD OF CONTROLLING AN AUTOSTEREOSCOPIC DISPLAY

[75] Inventors: Graham John Woodgate; David Ezra; Nicolas Steven Holliman; Basil Arthur Omar; Richard Robert Moseley; Jonathan Harrold, all of Oxford, United Kingdom

[73] Assignee: Sharp Kabushiki Kaisha, Osaka, Japan

[21] Appl. No.: 592,563

[22] Filed: Jan. 26, 1996

[30] Foreign Application Priority Data

Feb. 9, 1995 [GB] United Kingdom .................. 9502555

[51] Int. Cl.$^6$ .................................................. G02B 27/22
[52] U.S. Cl. .............................................. 359/463; 348/59
[58] Field of Search ................................. 359/462, 463, 359/464; 348/59, 60, 51; 349/15; 345/139

[56] References Cited

U.S. PATENT DOCUMENTS

| 5,065,236 | 11/1991 | Diner | 358/88 |
| 5,083,199 | 1/1992 | Borner | 358/88 |
| 5,581,402 | 12/1996 | Taylor | 359/463 |

FOREIGN PATENT DOCUMENTS

| 0354851 | 2/1990 | European Pat. Off. . |
| 0404289 | 6/1990 | European Pat. Off. . |
| 0404289 | 12/1990 | European Pat. Off. . |
| 0576106 | 12/1993 | European Pat. Off. . |
| 0602934 | 6/1994 | European Pat. Off. . |
| 0656555 | 6/1995 | European Pat. Off. . |
| 2272555 | 5/1994 | United Kingdom . |

OTHER PUBLICATIONS

Search report mailed Sep. 24, 1996 for EPO Application 96300552.5.
Partial European Search Report for European Patent Application No. 96300552.5 Mailed Jun. 25, 1996.
Search Report for U.K. Appl. 9502555.7, mailed Apr. 10, 1995.
Pastoor et al, SID, vol. 30/3, 1989, "Subjective Assessments of the Resolution of Viewing Directions in a Multi–Viewpoint 3D TV System," pp. 217–223.
Akiyama et al, NTT Human Interface Labs, Nippon Tel., ITEC '91, 1991 ITE Annual Convention, "Three–Dimensional Visual Communication".
U.S. application No. 08/167,497, filed Dec. 15, 1993.
U.S. application No. 08/347,496, filed Nov. 30, 1994.
U.S. application No. 08/245,584, filed May 18, 1994.

*Primary Examiner*—Jon W. Henry

[57] ABSTRACT

An observer tracking display is provided in which the image data displayed by at least three image displays along respective different directions is updated depending on the lateral position of an observer. The image displayed in a viewing region not visible to the observer is updated with an appropriate image in anticipation of the observer moving to a position where that viewing region is visible.

26 Claims, 20 Drawing Sheets

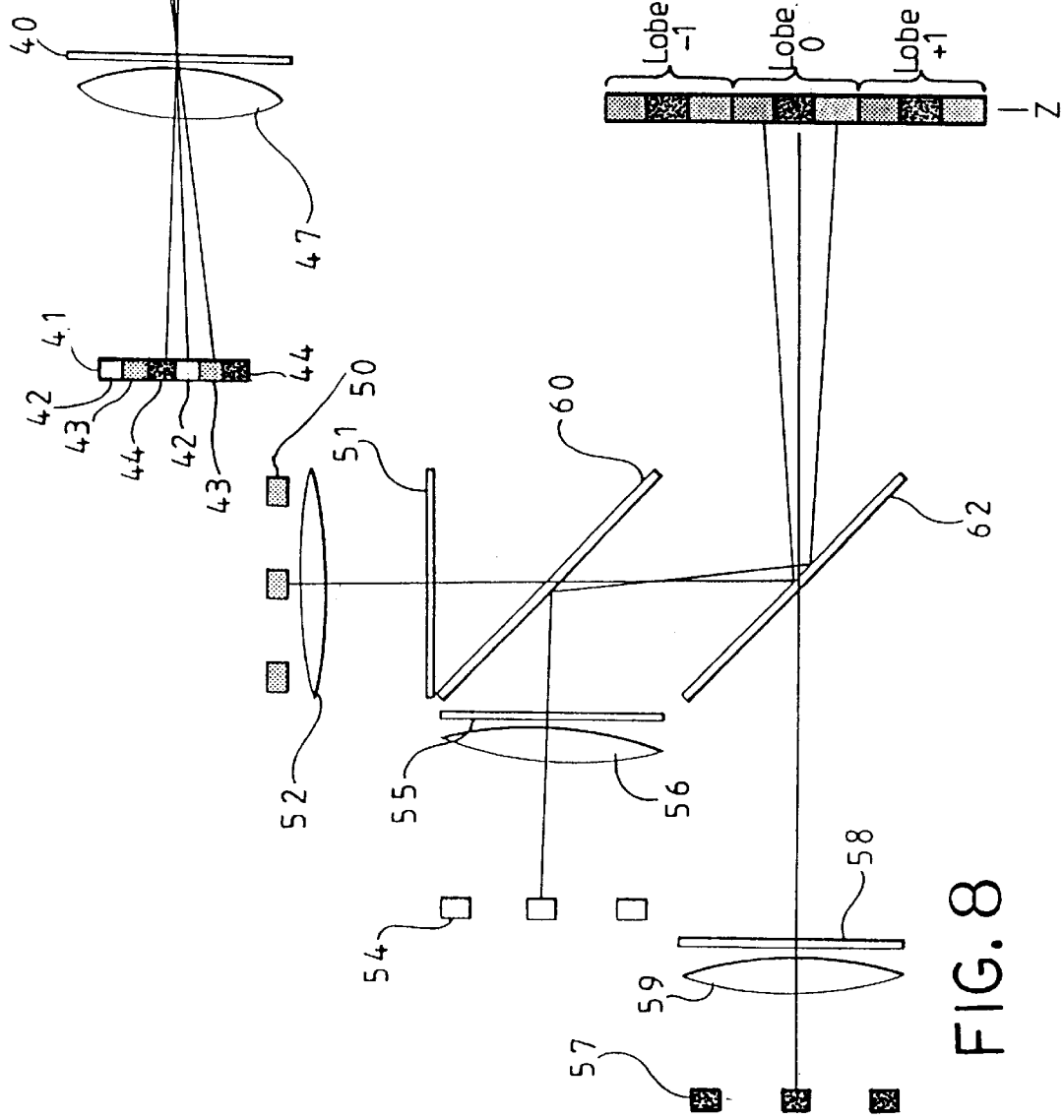

Continuous parallax pixel configuration

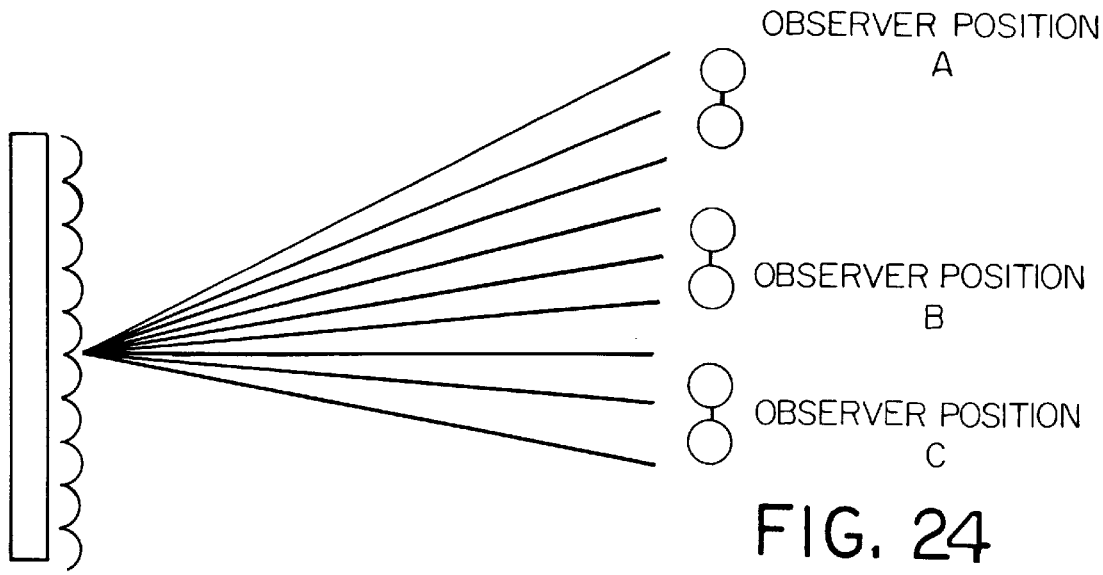
FIG. 24
VIEW FROM OBSERVER POSITION A, WALL VISIBLE
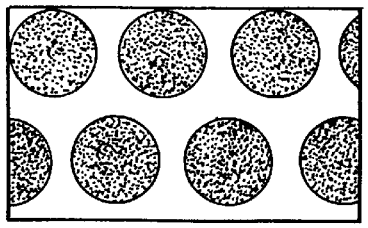
FIG. 25
VIEW FROM OBSERVER POSITION B, SWORD VISIBLE BEHIND WALL, CAN ONLY BE PICKED UP IN THIS POSITION
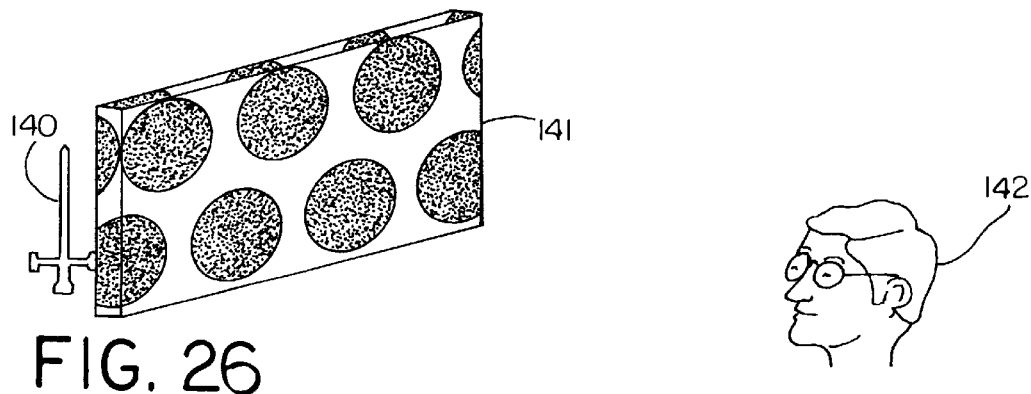
FIG. 26
VIEW FROM OBSERVER POSITION C: INTERFACE WITH GAME CHARACTER
FIG. 27

AUTOSTEREOSCOPIC DISPLAY AND METHOD OF CONTROLLING AN AUTOSTEREOSCOPIC DISPLAY

The present invention relates to an autostereoscopic display, and to a method of controlling an autostereoscopic display.

It is desirable to provide an autostereoscopic display in which the three dimensional effect is perceived for a wide range of observer positions.

Methods of producing autostereoscopic images rely on presenting different views to the left and right eyes of an observer. This can be achieved by dividing the views for the left and right eyes into a series of interleaved vertical stripes. A lenticular screen is then placed adjacent the composite image such that each lenticule covers one view slice of the left eye image and one view slice of the right eye image.

Electrically controlled displays may also split the left and right eye images into vertical stripes and replay the images along different directions using a lenticular screen. In another arrangement, two screens may display the images for the left and right eyes, respectively, and the images therefrom can be combined by a beam combiner. Such a display is disclosed in EP-A-0602934. A single spatial light modulator can also be driven in a time multiplexed manner to reproduce the left and right eye images, the position of a source of illumination being varied in a time multiplexed manner so as to project the different images in different directions. The displays require the viewer to be positioned in a defined viewing region to observe the 3D effect. K. Akiyama and N. Tetsutani, "3-Dimensional Visual Communication", ITEC'91: 1991 ITE Annual Convention, disclose an observer tracking autostereoscopic display in which a liquid crystal display device is positioned in close proximity to a lenticular sheet such that each lenticule is in front of two columns of pixels of the LCD display. Such an arrangement angularly multiplexes the light emitted from the columns of pixels in the display. The display is driven so as to provide interlaced left and right images for projection to the left and right eyes of an observer. Movement of the observer makes it possible for the observer's left eye to be in a position where it receives the image intended for the observer's right eye and vice versa. A position detector monitors the position of the observer's head and is arranged to swap the left and right images over in response to movement of the observer such that the correct image is presented to the correct eye.

Such a system will allow limited freedom of movement of an observer laterally with respect to the display.

EP-A-0 354 851 discloses both a "two window" and a "four window" display. As shown in FIG. 1 of the accompanying drawings, the constituent parts of the autostereoscopic image in a two window display converge at viewpoint corrected zones. Image data for a first two dimensional (2D) image originating from a first end of the display 5 is constrained to lie in a zone 6, whereas image data for the same 2D image originating from an opposite side of the display is constrained within a zone 8. The zones 6 and 8 overlap to provide a first viewpoint corrected zone 12. Similarly, image data for a second 2D image is constrained to lie in zones 7 and 10 and these zones overlap to provide a second viewpoint corrected zone 14. The observer can perceive an autostereoscopic image when one of the observer's eyes is in the first viewpoint corrected zone 12 and the other of the observer's eyes is in the second viewpoint corrected zone 14. If the observer's eyes are not within the viewpoint corrected zones, the observer does not see a 3D image over the whole of the display.

The "four window" display is an extension of the two window display and operates on the same principle. In each case the view point corrected zones have a distorted "diamond" shape. The maximum widths of the view point corrected zones occur at a nominal viewing distance from the display. It is convenient to describe the maximum width of the viewpoint corrected zone as being a "window".

The "four window" display disclosed in EP-A-0 354 851 has a lenticular screen disposed adjacent a display device. Each lenticule is associated with a respective set of four columns of pixels. Considering just a single row of pixels for simplicity, two of the pixels $R_1$ and $R_2$ display image data for presentation to the observer's right eye whereas the other two pixels $L_1$ and $L_2$ display image data for presentation to the observer's left eye. The pixels $R_1$, $R_2$, $L_1$ and $L_2$ can be arranged in any one of four combinations, these are: $R_1$-$R_2$-$L_1$-$L_2$, $L_1$-$L_2$-$R_1$-$R_2$, $L_2$-$R_1$-$R_2$-$L_1$ and $R_2$-$L_1$-$L_2$-$R_1$. Thus the images presented to each window are swapped simultaneously, in order to provide observer tracking with no moving pacts.

The prior art systems place exceptionally high demands on the accuracy of the tracking equipment. The views must be changed exactly when each of the observer'eyes passes from one window to an adjacent window.

It is desirable to provide a "look around" display in which the view presented to the observer is a function of the observer's position. It has been estimated that sixty views per interocular separation may be required in order to achieve an artifact free representation of a 3D image. A 500 line lenticular display having a width of 250 mm implies that the size of each lenticule will be 0.5 mm. Sixty interocular views would imply a maximum pixel size of 8 micrometers. Such a fine pixel pitch is not presently available over such a large distance. Providing such a number of views by means of a beam combiner-type display would require sixty spatial light modulators. Embodying such a display as a temporally multiplexed display would require a frame refresh rate of the order of 3 kHz.

The number of simultaneously presented views required to provide a "look around" 3D image can be greatly reduced by using an observer tracking display, since only the views directed towards the observer's eyes need be displayed. An arrangement in which the positions of the "windows" are movable so as to move with movement of an observer is disclosed in EP 0 576 106 and EP 0 656 555. EP 0 576 106 also discloses the concept of providing a "look around" facility.

According to a first aspect of the invention, there is provided a display as defined in the appended claim 1.

According to a second aspect of the invention, there is provided a method as defined in the appended claim 15.

According to a third aspect of the invention, there is provided a display as defined in the appended claim 16.

Preferred embodiments of the invention are defined in the other appended claims.

It is thus possible to provide a display in which the observer has a greatly enhanced freedom of lateral movement, sensitivity to tracking errors is reduced and a "look around" facility may be provided.

The views may be views of a moving scene. Each of the views may be updated to show movement within the individual views. Thus the term "updating" as used herein more specifically relates to swapping the images representing different stereoscopic viewing directions.

Thus, the requirement for accuracy of the tracking system can be reduced since the window towards which an eye is moving and is about to enter can be updated to display the same view information as the window that the eye is currently in and is about to leave. Thus the necessity for accurate positional information to achieve image switching can be eliminated.

The present invention will further be described, by way of example, with reference to the accompanying drawings, in which.

Figure 3:
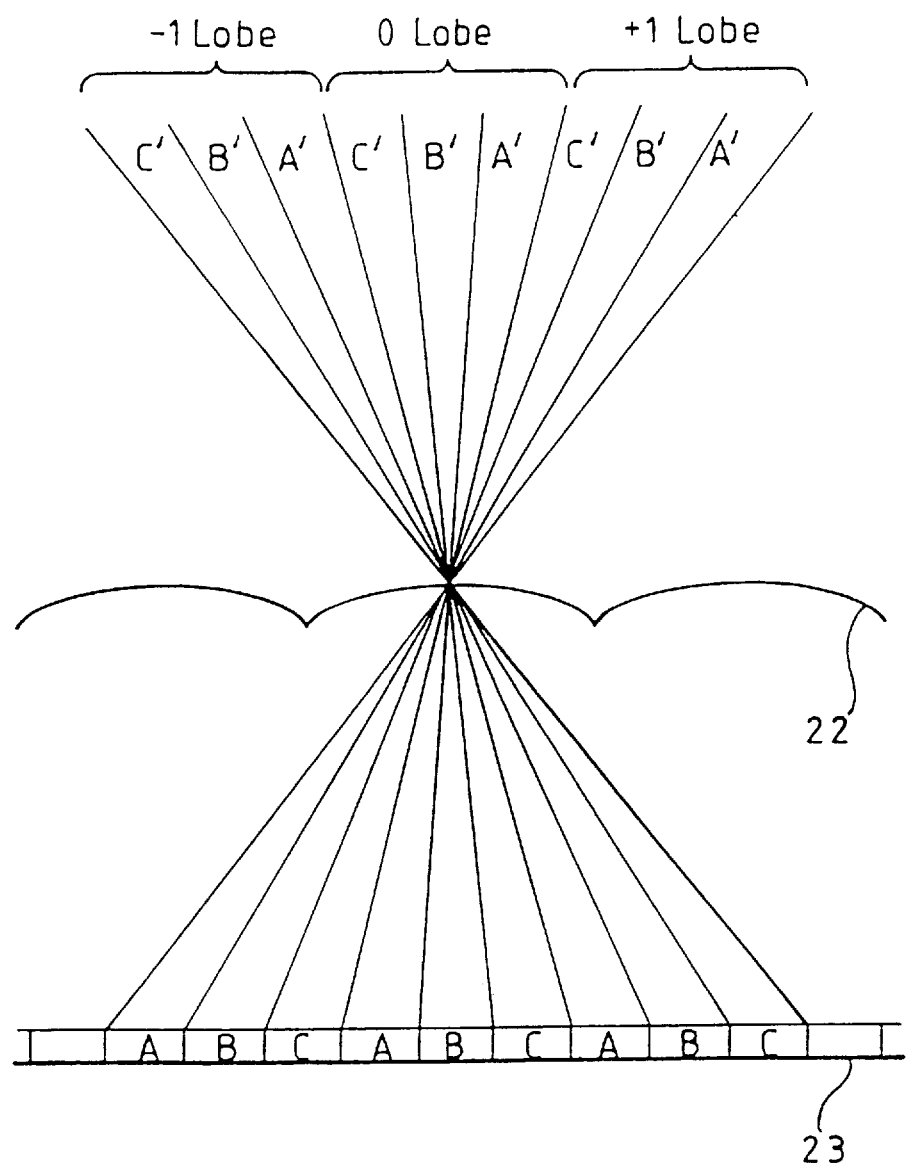
Figure 4:
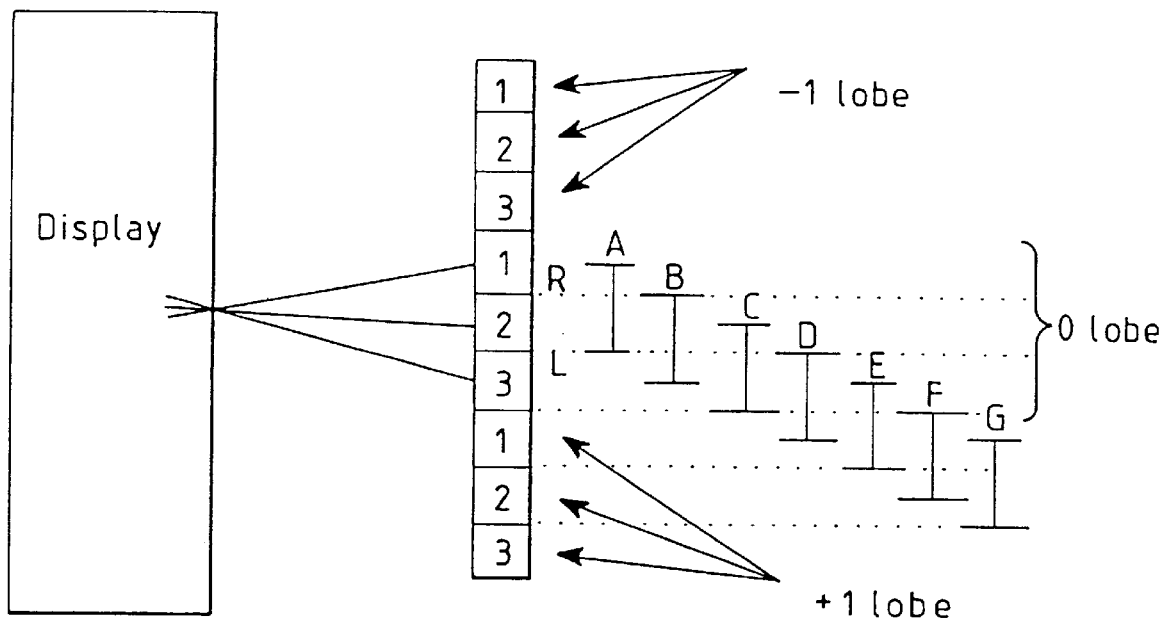
Figure 5:
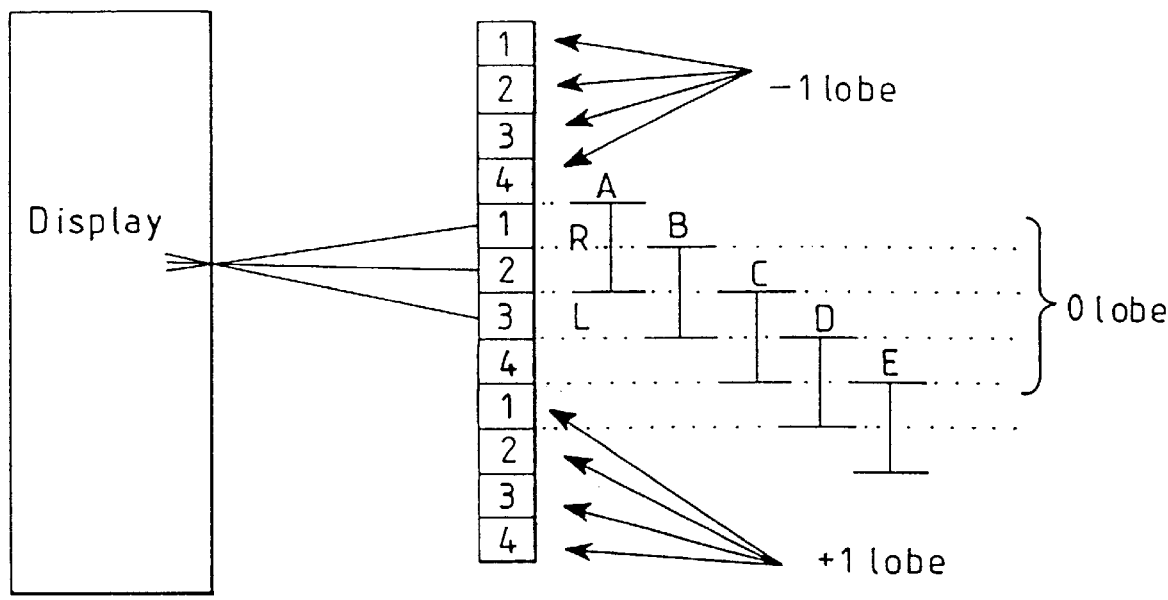
Figure 6A:
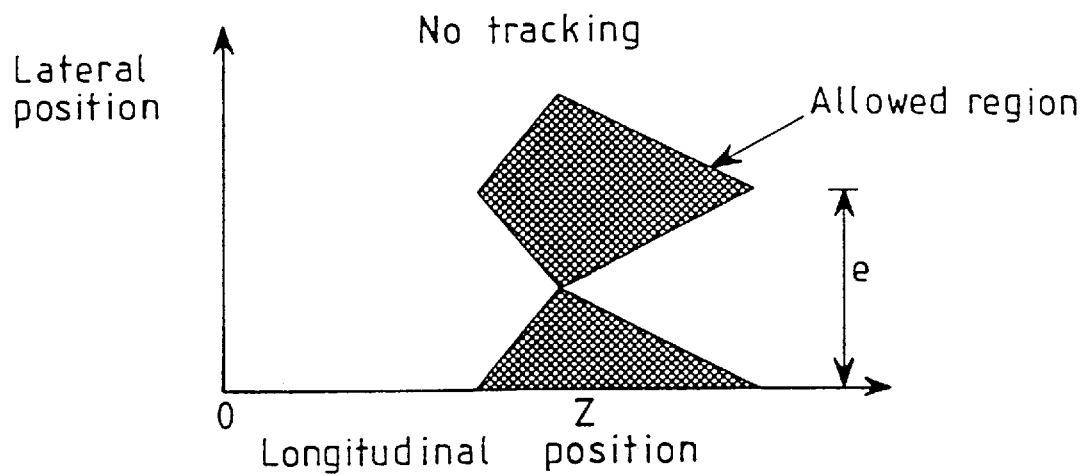
Figure 6B:
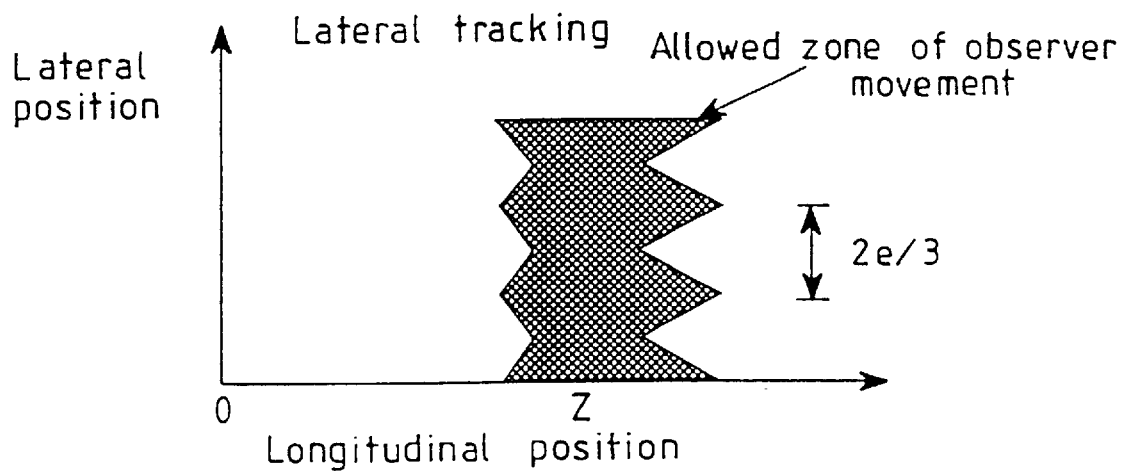
Figure 9:
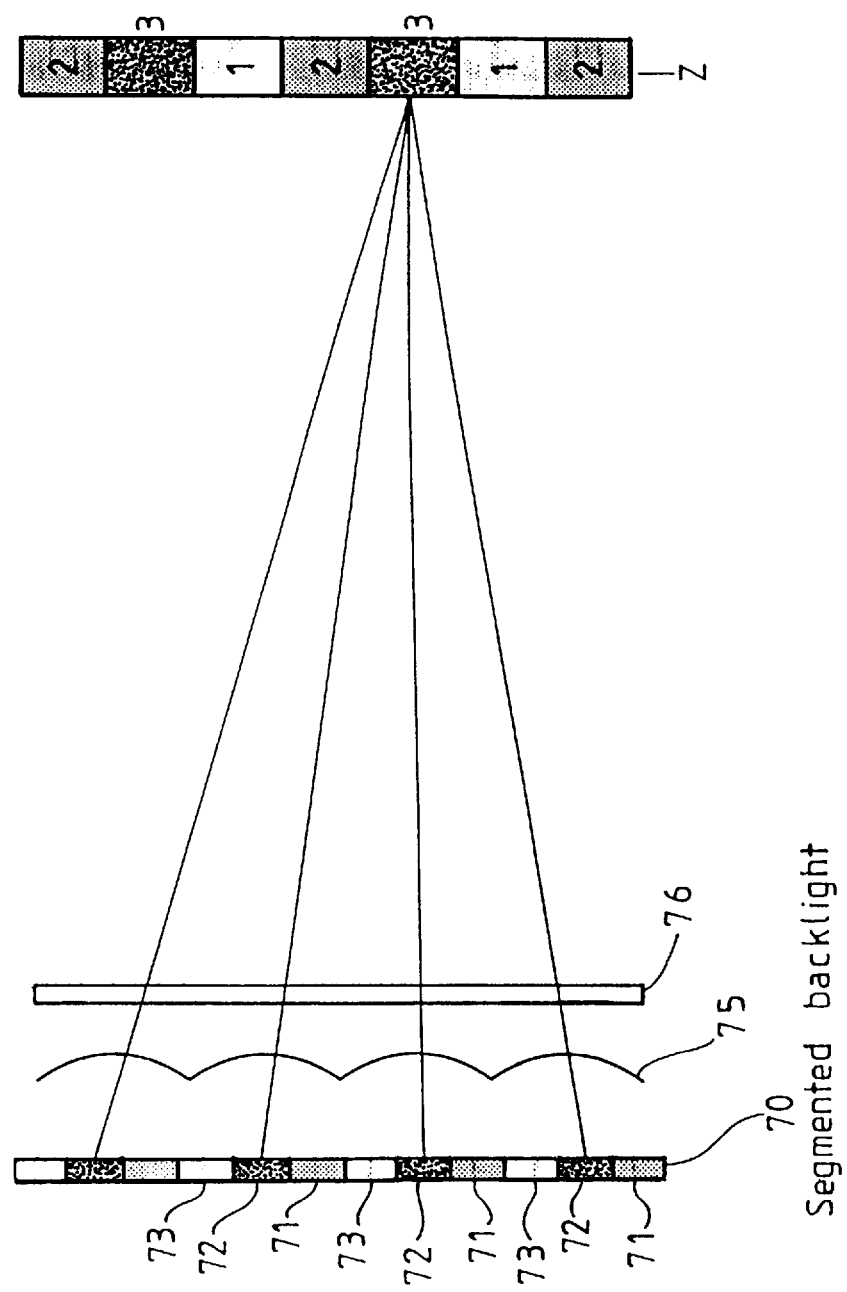
Figure 10:
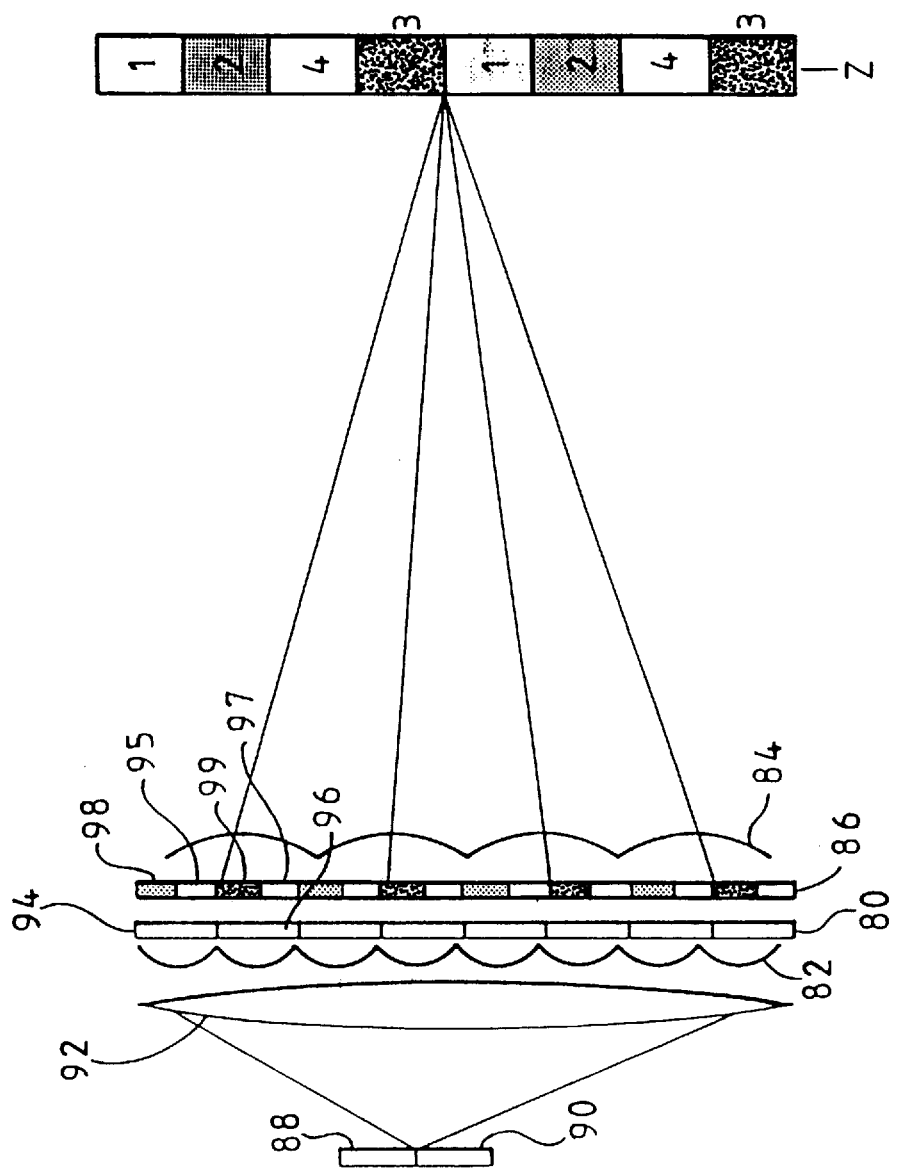
Figure 11:
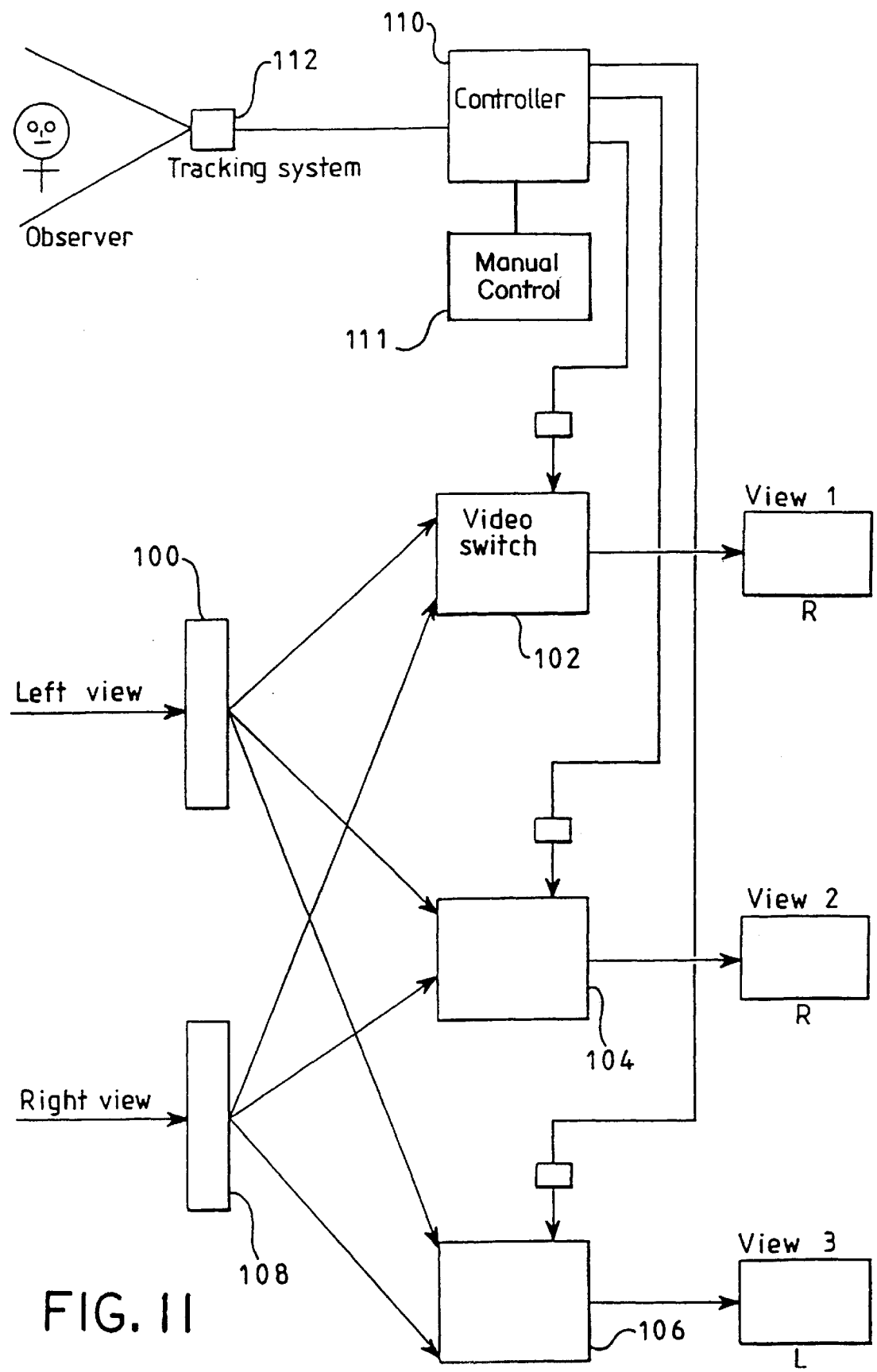
Figure 12:
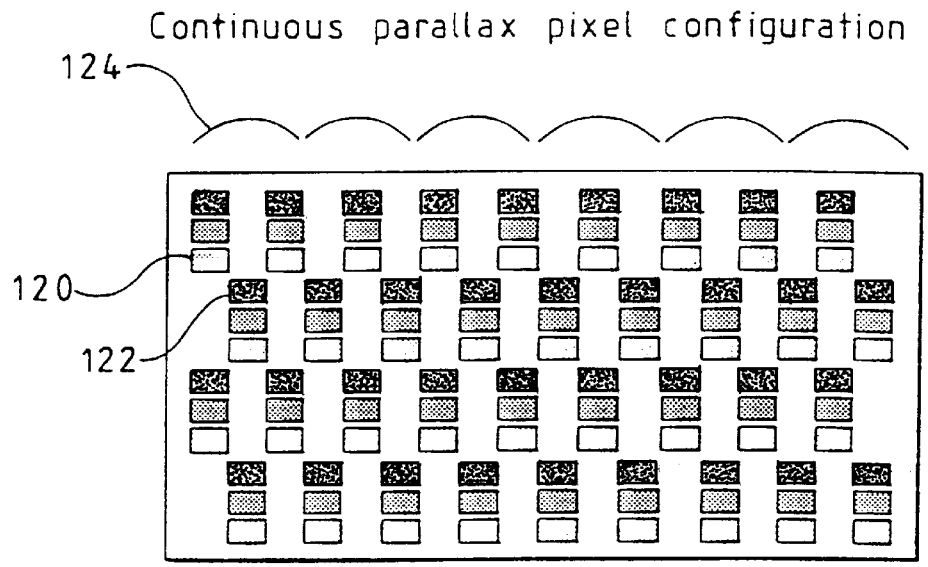
Figure 13:
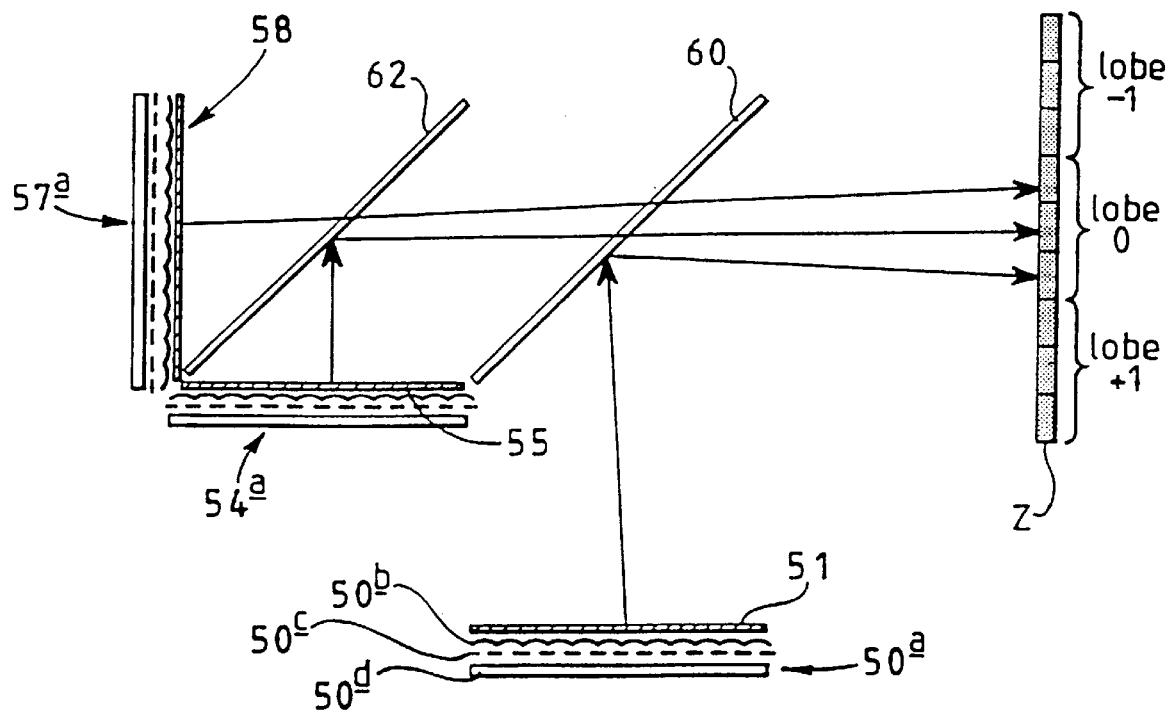
Figure 14:
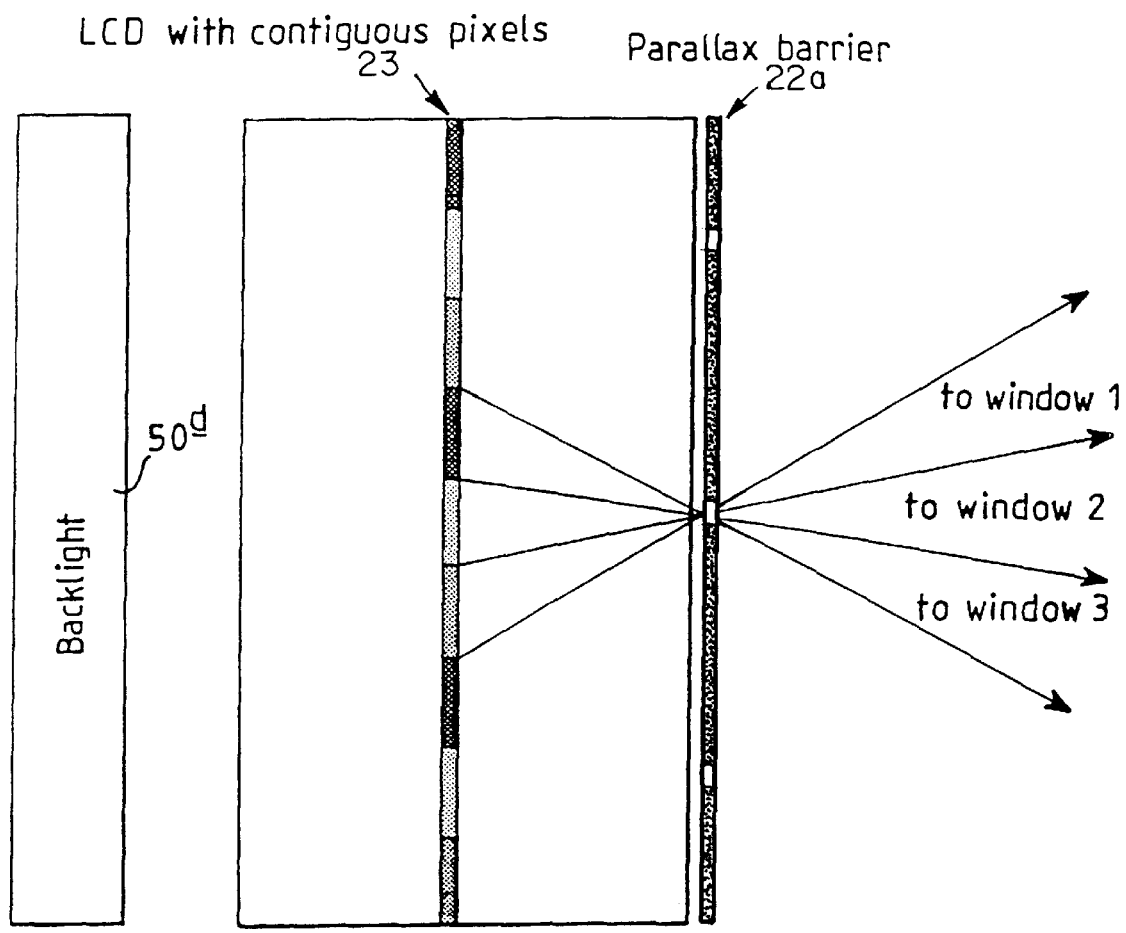
Figure 15:
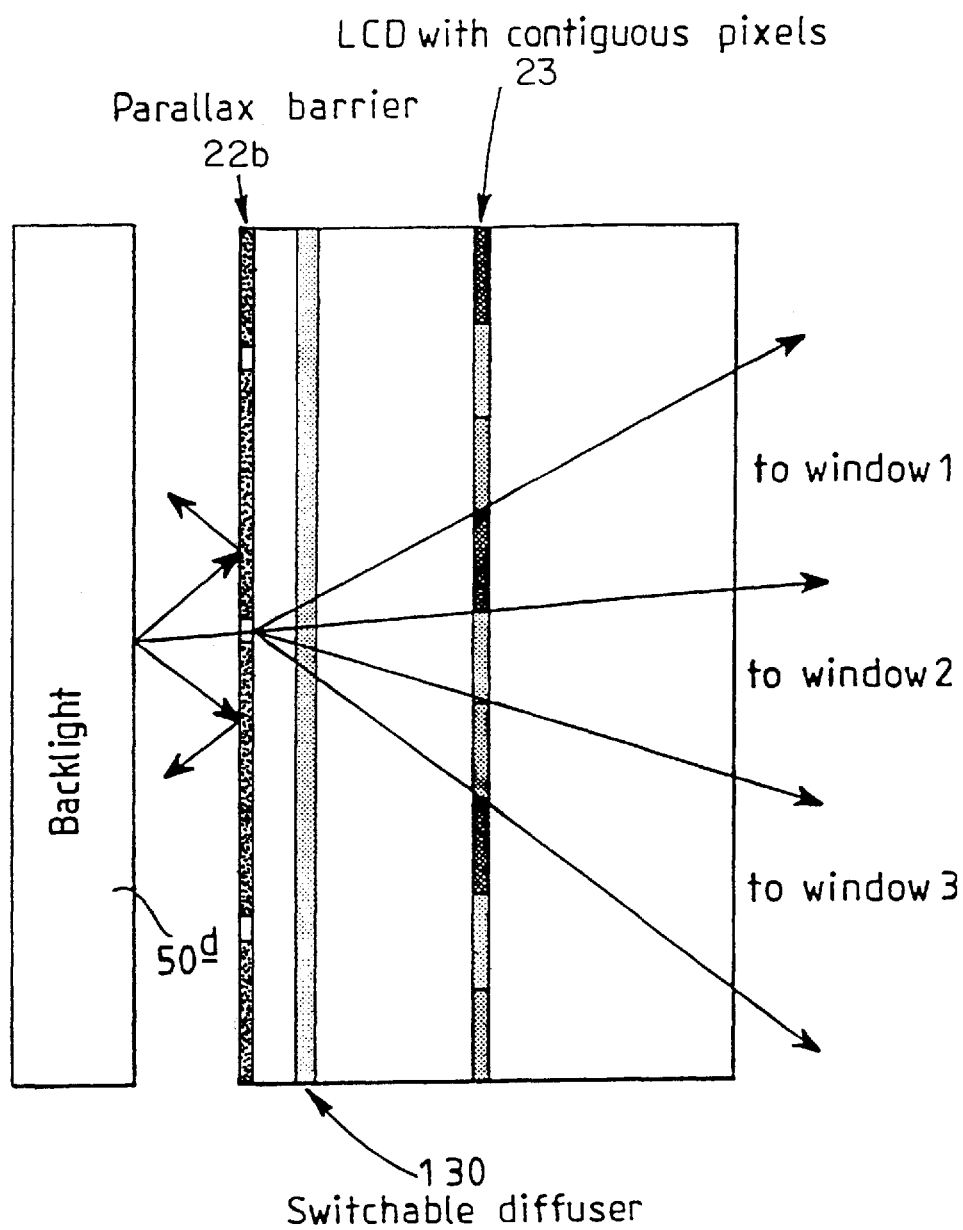
Figure 16:
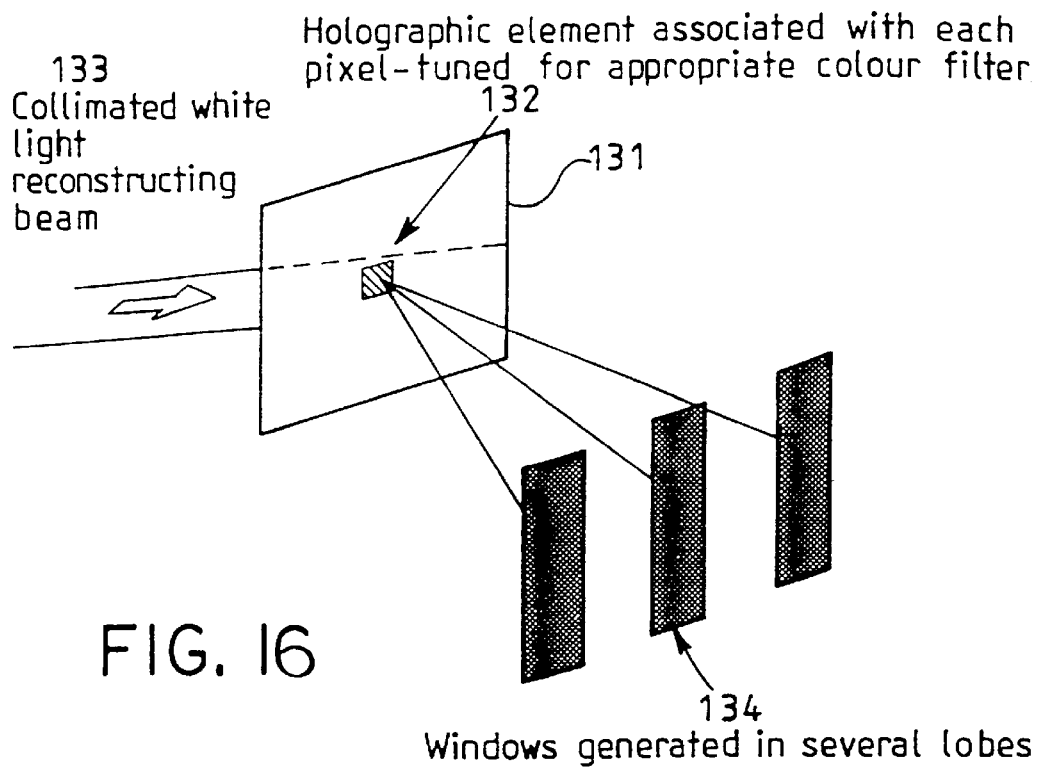
Figure 17:
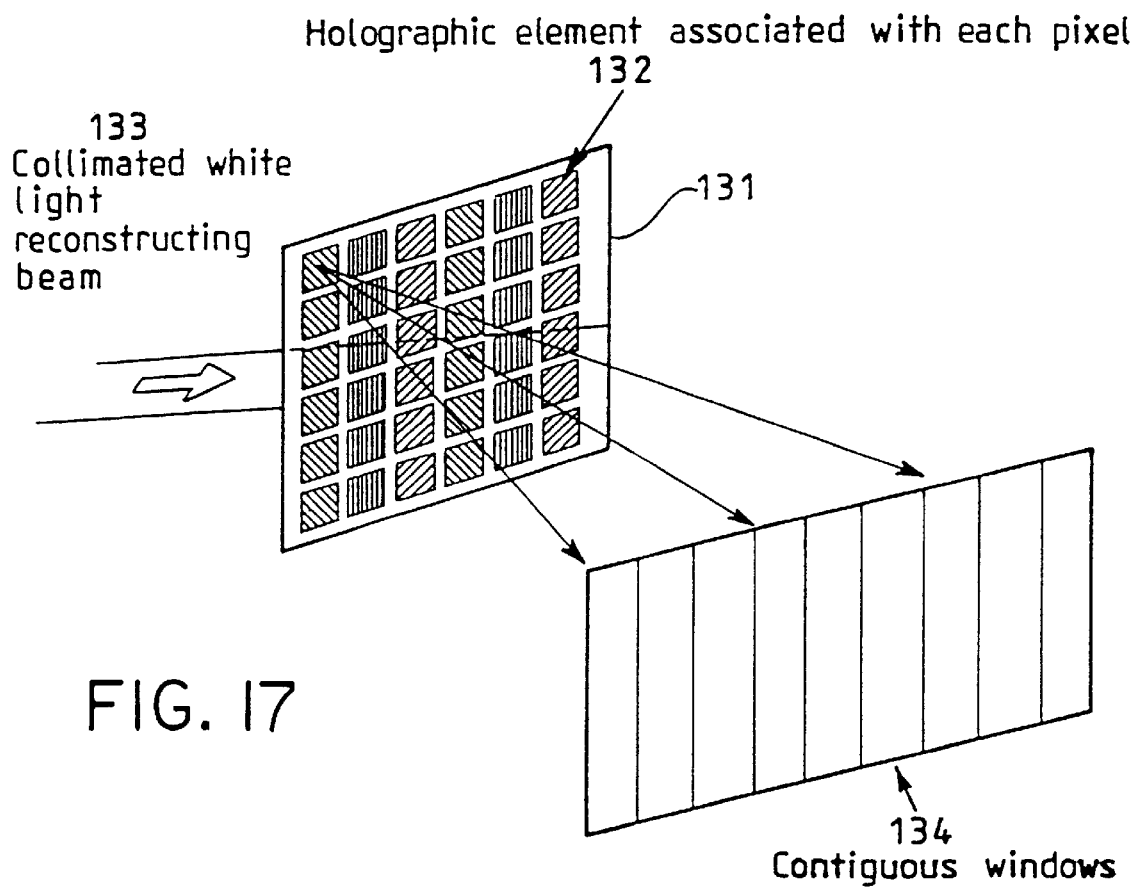
Figure 18:
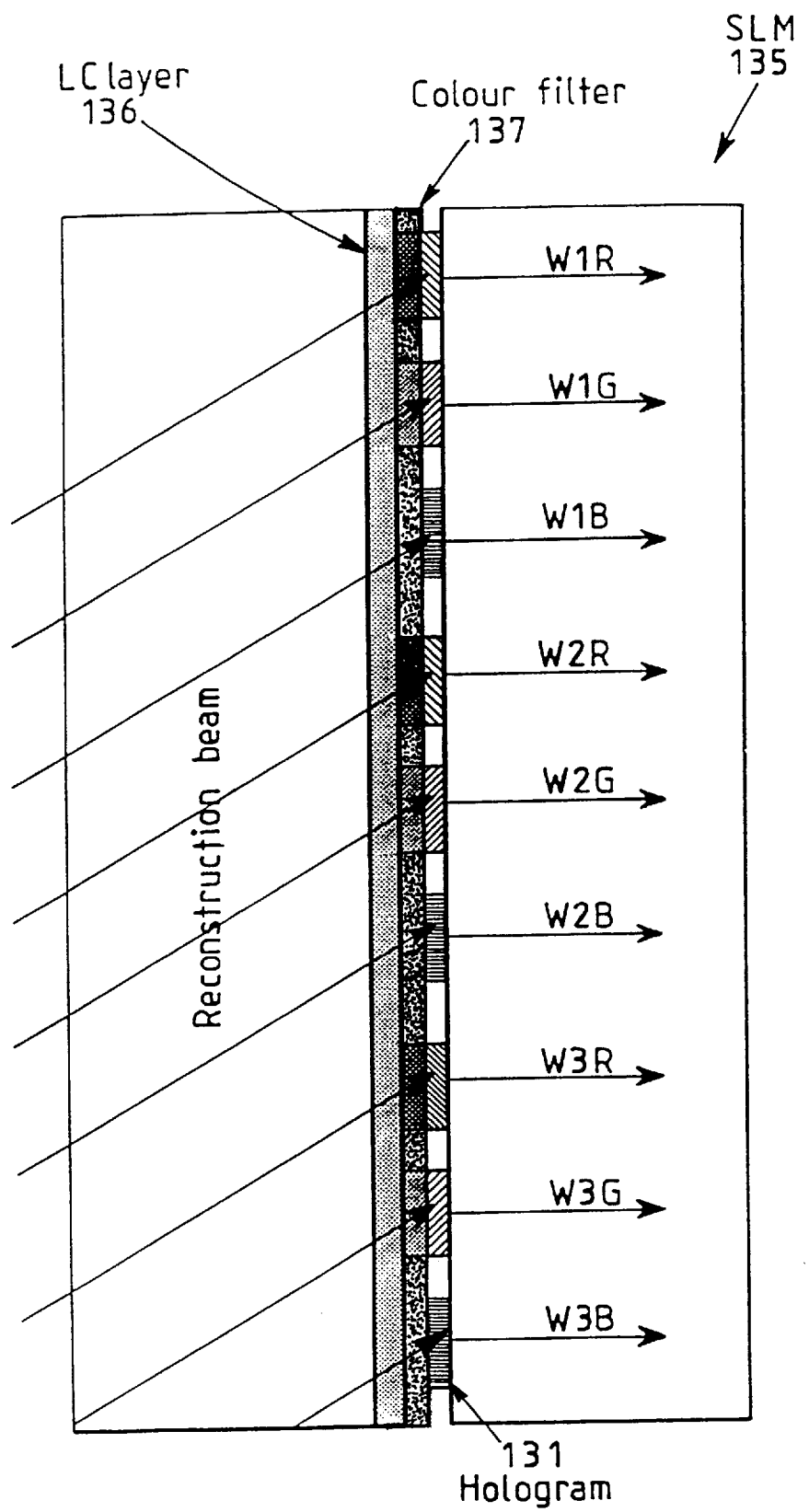
Figure 19:
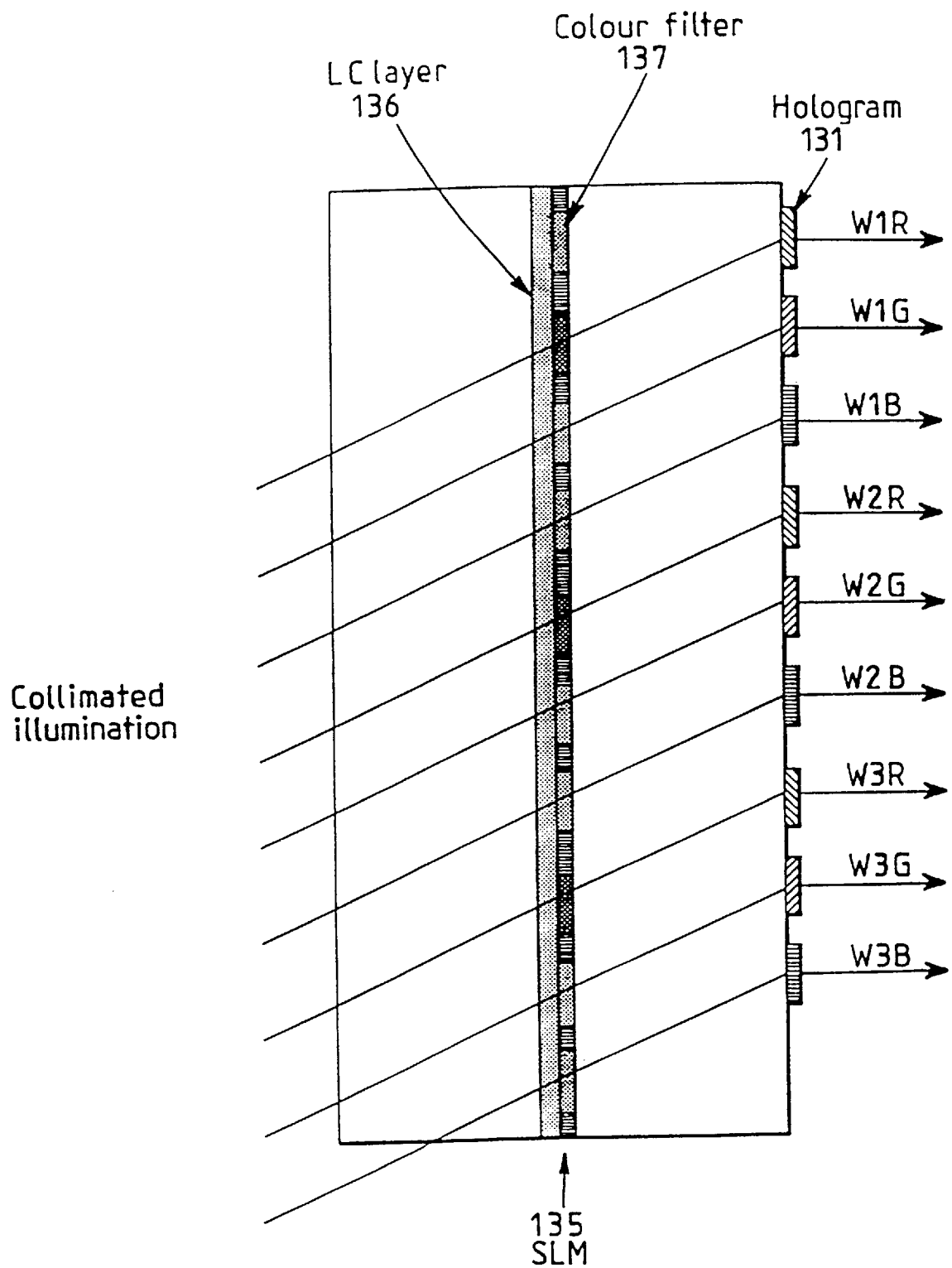
Figure 20:
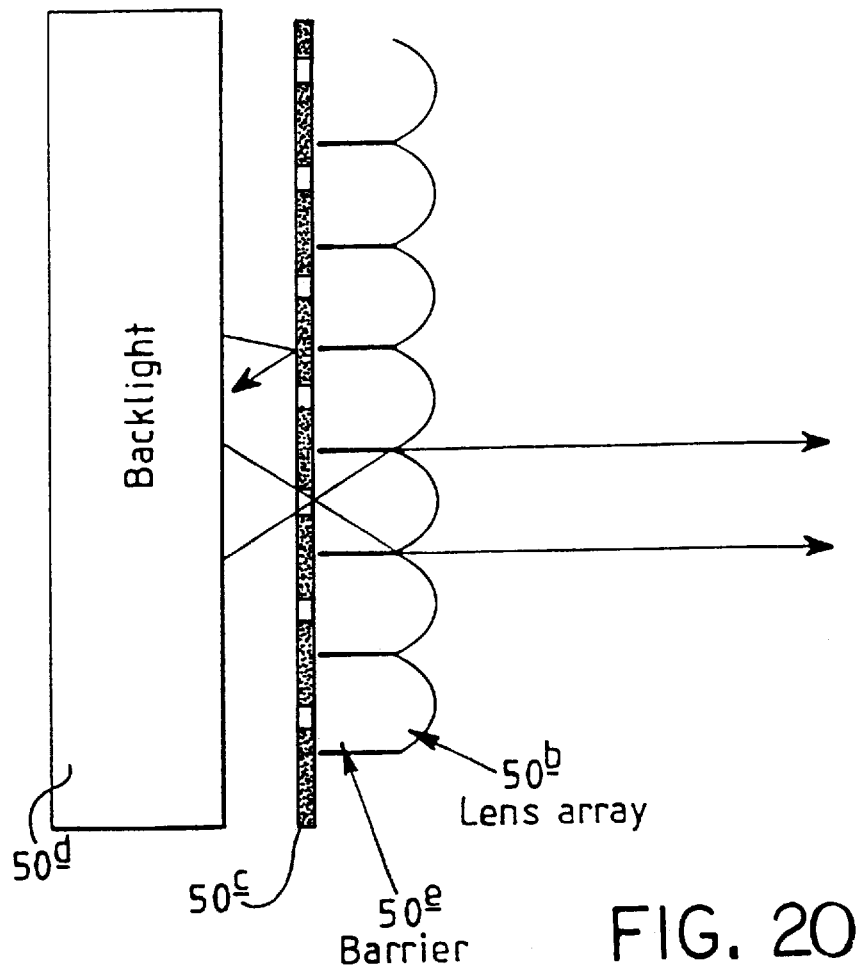
Figure 21:
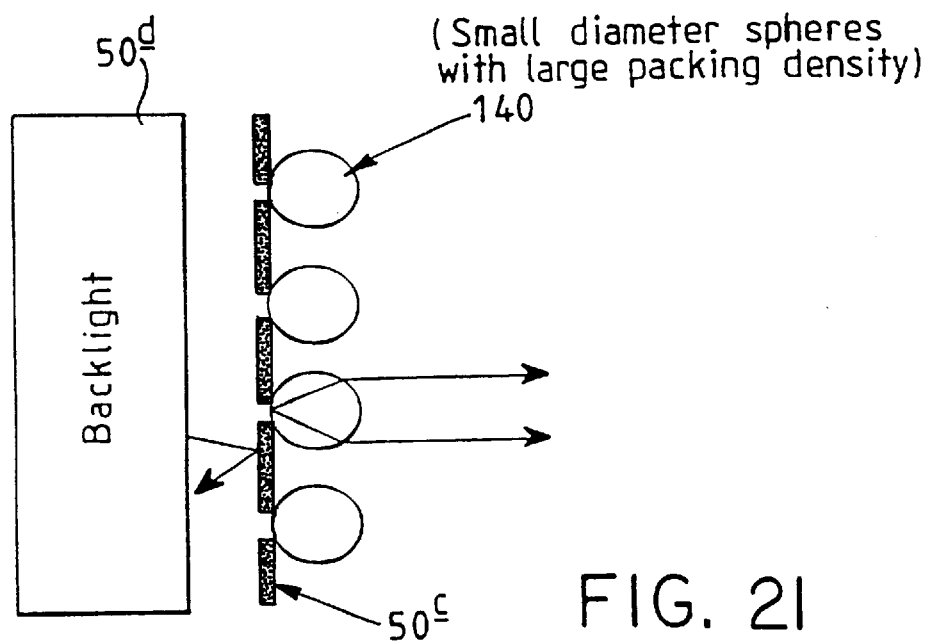
Figure 22:
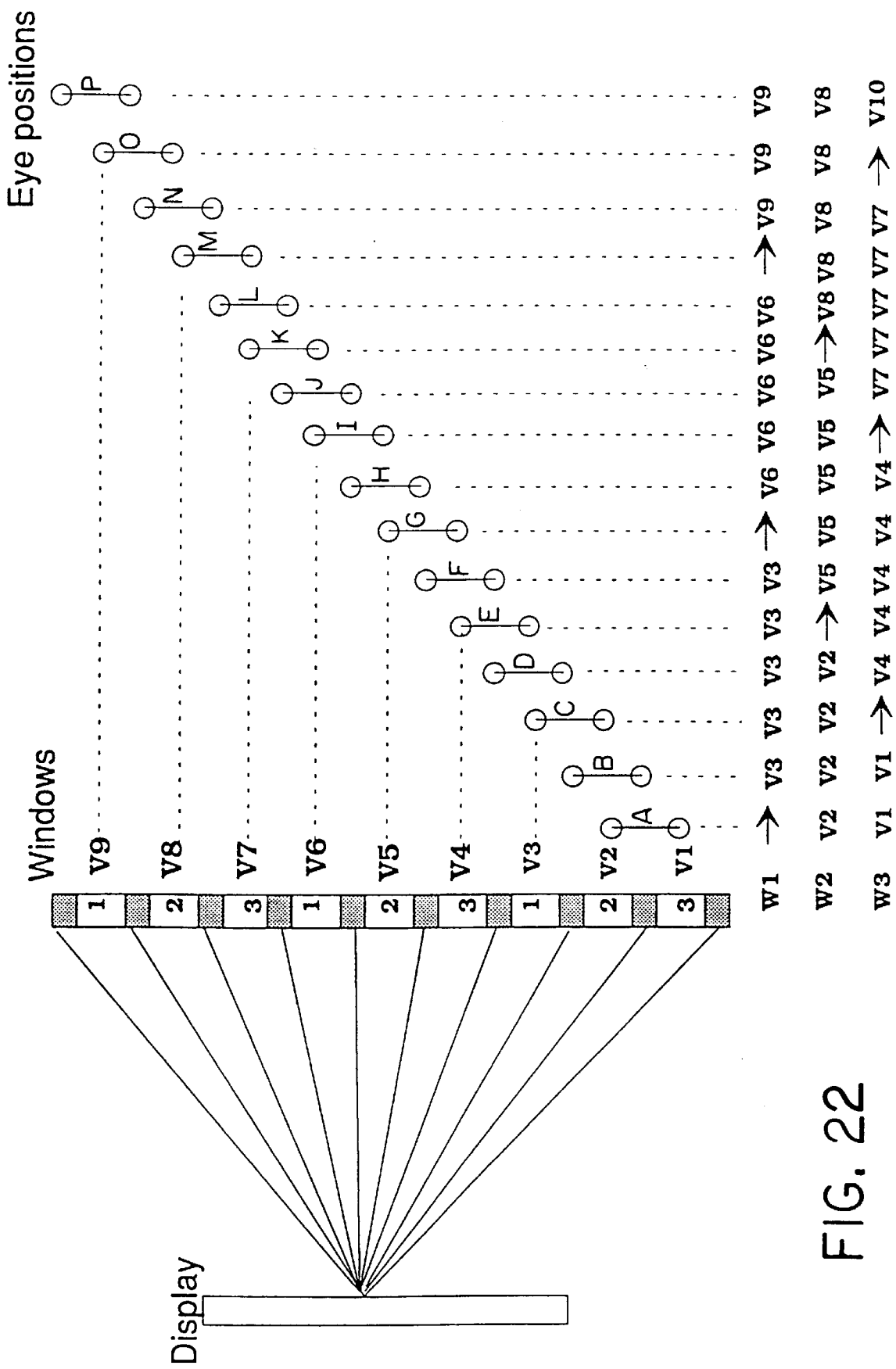
Figure 23:
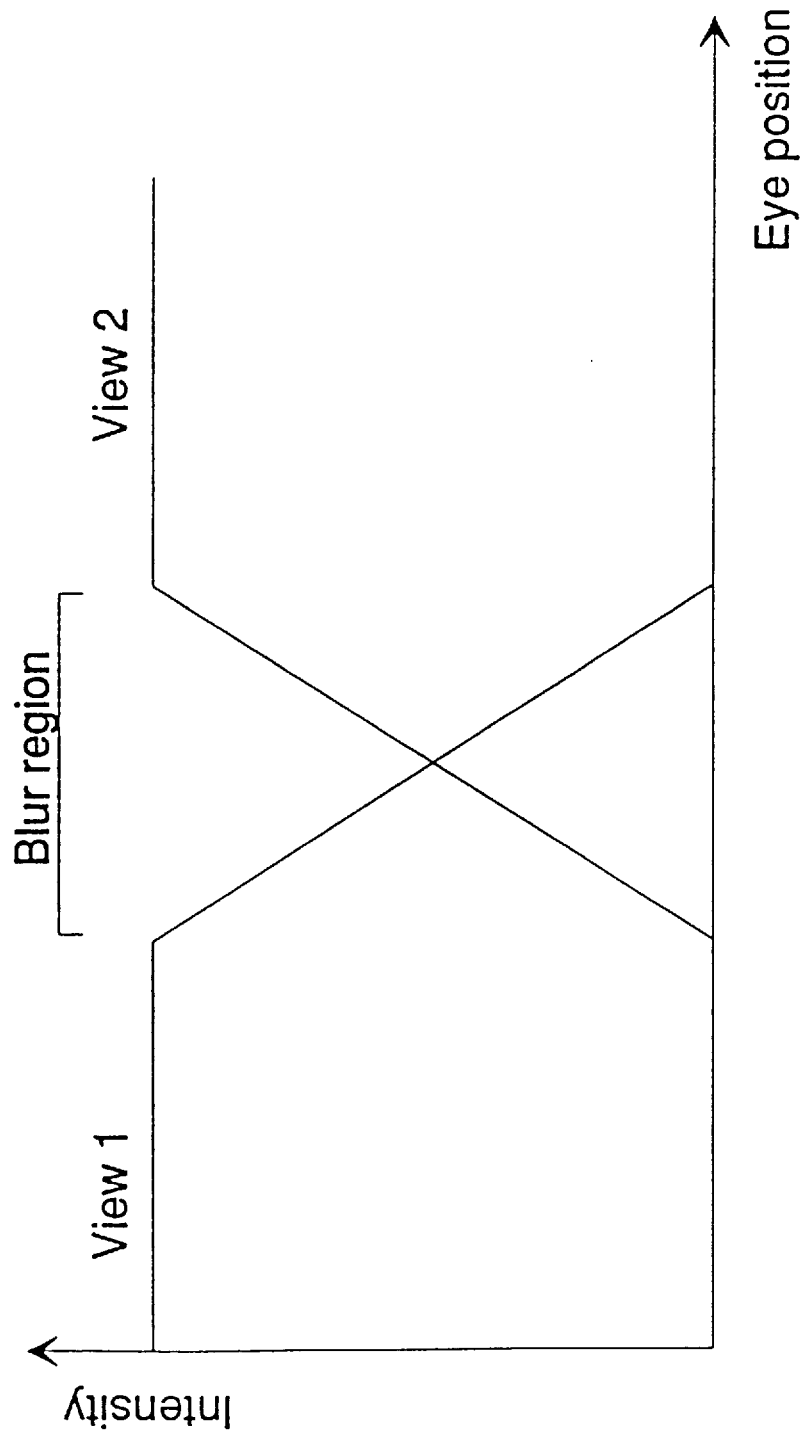

FIG. 3 schematically shows the generation of a three view, three lobe display by a single spatial light modulator and a lenticular array;

FIG. 4 is a schematic illustration of the output of a multi-lobe three window display constituting an embodiment of the present invention and the image switching requirements thereof;

FIG. 5 is a schematic illustration of the output of a multi-lobe four window display constituting an embodiment of the present invention and the image switching requirements thereof;

FIGS. 6a and 6b schematically illustrate the range of positions with respect to the display in which an observer will perceive the autostereoscopic effect;

FIG. 7 is a schematic illustration of a time multiplexed display constituting an embodiment of the present invention;

FIG. 8 is a schematic illustration of a three view beam combiner display constituting an embodiment of the present invention;

FIG. 9 is a schematic diagram of a time multiplexed display with compact illumination constituting an embodiment of the present invention;

FIG. 10 is a schematic diagram illustrating a four view display constituting a further embodiment of the present invention;

FIG. 11 schematically illustrates the tracking and image controller for a display constituting an embodiment of the present invention;

FIG. 12 schematically illustrates a pixel arrangement within an LCD screen for allowing the formation of contiguous image zones in lenticular displays;

FIG. 13 is a schematic illustration of another three view beam combiner display constituting an embodiment of the invention;

FIG. 14 is a schematic sectional view of part of a display using a front parallax barrier;

FIG. 15 is a schematic sectional view of part of a display using a rear parallax barrier;

FIGS. 16 and 17 illustrate diagrammatically the use of holograms to form viewing windows;

FIG. 18 is a schematic sectional view of part of a display using an internal hologram;

FIG. 19 is a schematic sectional view of part of a display using an external hologram;

FIGS. 20 and 21 are schematic sectional views of compact backlight for illuminating holograms;

FIG. 22 is a schematic illustration of the output of a multi-lobe three window display constituting an embodiment of the present invention and the image switching requirements thereof;

FIG. 23 is a graph of image intensity against eye position for the display illustrated in FIG. 22;

FIG. 24 illustrates use of a display of the type shown in FIG. 22 with manual control of observer position for a computer game; and FIGS. 25 to 27 illustrate images produced by the display of FIG. 24 and visible to an observer in different positions.

Figure 1:
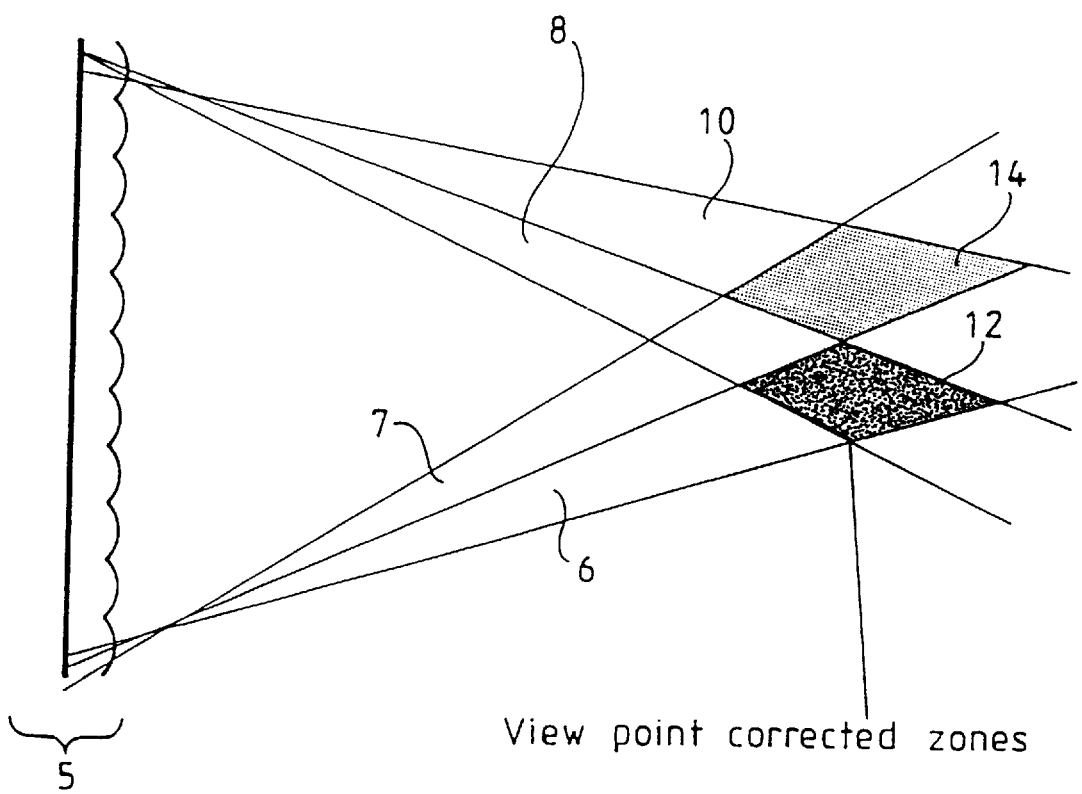
FIG. 1 is a diagram schematically illustrating the positions of view point corrected zones for a two window display.

As shown in FIG. 1, an autostereoscopic display emits (in plan view) cones of light along predetermined directions. Each cone of light represents part of a view from a given viewing position. Cones relating to the same view, but emanating from different parts of the display can be arranged to converge at a view point corrected zone by, for example, making the pitch of a lenticular screen within the display slightly less than the pitch of pixel groups within the display. The distance between the display 5 and the widest portions of the viewpoint corrected zones 12 and 14 corresponds to a design viewing distance for the display. The positions of the viewpoint corrected zones for the display of FIG. 1 are fixed in space with respect to the display and hence such a display has a limited viewing area where the three dimensional effect can be perceived. Lateral movement of an observer will result in loss of the stereoscopic image if either of the observer's eyes moves outside a viewpoint corrected zone or if both eyes move into the same viewpoint corrected zone.

Figure 2:
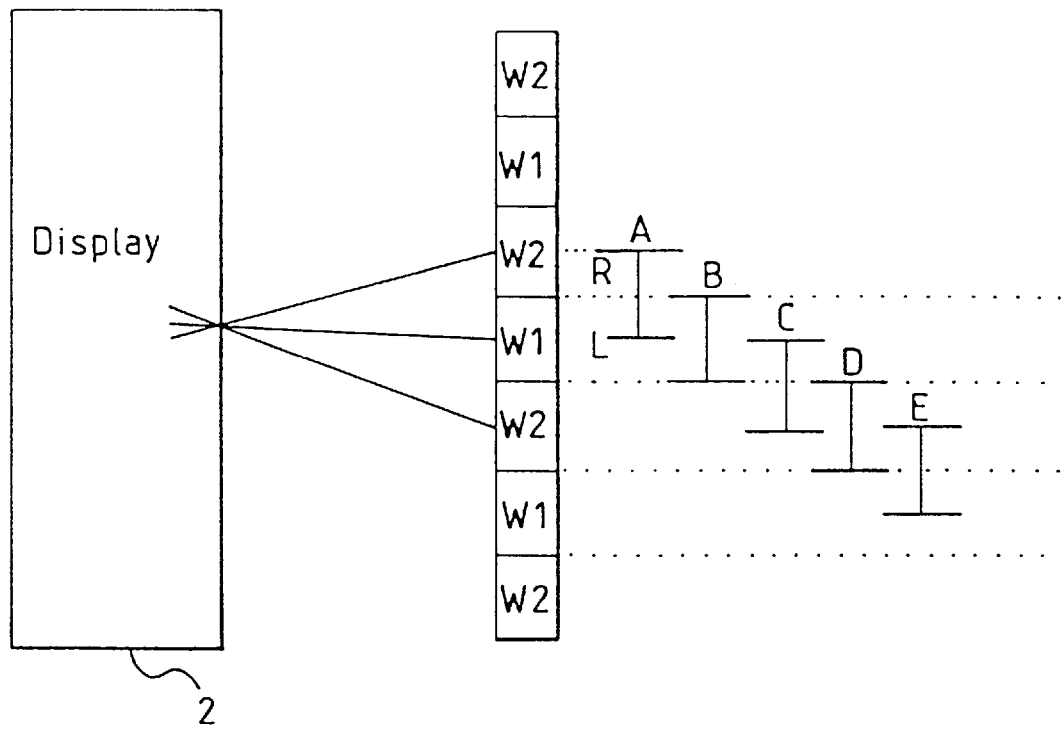
FIG. 2 is a schematic illustration of the output of a multi-lobe two window display and the image swapping requirements thereof.

The display may be arranged to form a repeating pattern of viewpoint corrected zones. The zones can be positioned such that they define a repeating pattern of contiguous "windows", as shown in FIG. 2 for a two window display. The "windows" are defined by the widest regions of the view point corrected zones.

The display 2 produces an output which is a repeating pattern of first and second viewing windows labelled W1 and W2, respectively. Each of the positions A to E in FIG. 2 represents only the lateral position of the observer. The longitudinal position of the observer is coincident with the windows. With the observer at position "A", the observer's left eye observes the image presented in window W1, whereas the observer's right eye observes the image presented in window W2. If the observer moves to position "C", then the image data shown in windows W1 and W2 must be swapped in order to maintain the autostereoscopic view. Furthermore, movement between positions A and C will result in the observer's eyes moving through position B. Position B represents a boundary position where the images presented to the observer's eyes must be swapped. The images viewed by each eye must be swapped at the same time such that both eyes do not receive the same view. Otherwise the autostereoscopic effect will be lost.

As noted hereinabove, the positions at which the images presented to each eye must be swapped in order to maintain a true 3D effect must be accurately determined.

The problems of the prior art displays can be overcome by using a display which has a display output having at least three windows in conjunction with an image controller which can control the image presented to each window independently. The display advantageously forms a repeating pattern of the windows to allow a greater range of lateral movement of the observer.

FIG. 3 schematically illustrates in plan view the generation of three views immaged into three lobes using a lenticular array 22 and a spatial light modulator 23. The spatial light modulator 23 is arranged to display three images simultaneously in a spatially multiplexed fashion—and hence acts as three different displays. The first display is composed of pixels A, the second display is composed of pixels B, and the third display is composed of pixels C. The displays are interleaved so as to form a repeating pixel pattern ABCABC etc. The lenticular array 22 comprises a plurality of lenticules whose individual widths are substantially the same as the spatial extent of the three pixels ABC.

Furthermore the centre of each lenticule is substantially aligned with its respective B pixel (this condition changes slightly for view point corrected displays where the pitch of the lenticules is slightly less than the pattern repeat pitch ABC—but those lenticules towards the centre of the display are substantially aligned with the respective B pixels). The images from the pixels are imaged through the lenticules—as shown—to provide three lobes, labelled −1, 0 and +1, each of which comprises three images A', B' and C'. As described hereinabove with reference to FIG. 1, view point correction results in the separate images combining within respective image regions, labelled 1, 2 and 3 in FIG. 4.

FIG. 4 schematically illustrates an autostereoscopic display comprising the lenticular display illustrated in FIG. 3. As before, image data are presented to the display device 23 so as to generate a number of output cones, each of which corresponds to a different view. Cones corresponding to the same view converge at a designed position so as to form a viewpoint corrected zone at which the observer can observe the autostereoscopic effect. The widest part of each viewpoint corrected zone defines a "window". The "window" occurs at a predetermined distance from the display device.

The windows are contiguous with one another and hence define a laterally extended viewing region at which the autostereoscopic effect can be observed provided that the image displayed in each window is updated in accordance with the observer's position.

The three windows are labelled 1, 2 and 3 and are imaged into three lobes labelled −1, 0 and +1. Generally, the size of each window is determined by 2e/N, where e is the average interocular separation of a particular user group (e.g. approximately 65 mm for the adult population, less for younger user groups) and N is the number of windows in each lobe. Thus, for the "three window" display, each window has a lateral extent of two-thirds of the average interocular separation of an adult. The display is arranged such that each window displays either left view data or right view data. The left and right views are not mixed within a window.

With an observer at position A of FIG. 4, the observer's right eye R is within the first window 1 of the zeroth lobe and the observer's left eye is at the boundary of the second and third windows 2 and 3 of the zeroth lobe. The positions A to G show the lateral position of the observer, but the longitudinal position is always at the nominal viewing distance. In order to provide an autostereoscopic view, the first windows 1 are controlled (via the first display) to show right view data and the second and third windows are controlled (via the second and third displays) to show left view data. As the observer moves from position A to position B, the observer's right eye moves towards the boundary between the first and second windows of the zeroth lobe. Similarly the observer's left eye. moves away from the boundary between the second and third windows of the zeroth lobe. The result is that the second window 2 becomes unobserved and the image data displayed thereby can be updated from left view data to right view data in anticipation of the observer arriving at position B. Once the observer is at position B, the observer's right eye is at the boundary between the first and second windows 1 and 2 of the zeroth lobe—both of which show right view data—whereas the observer's left eye is at the centre of the third window which shows left view data.

As the observer moves from position B to position C, the first window 1 of the +1 lobe is updated to show left view data in anticipation of the observer's left eye being at a position where the first window of the +1 lobe can be observed.

In such a display, all the first windows of all the lobes show the same image and are updated simultaneously. Thus, the first windows of the −1 and zeroth lobes are also updated, but this is of no consequence as the observer moving between positions B and C cannot see these windows.

The same sequence of events is repeated for movement between each of the positions, that is, the image displayed by a window is updated while the observer is not able to see that window.

FIG. 5 is similar to FIG. 4, but shows the situation for a display having four windows 1 to 4, each window having a lateral width of half the average interocular separation of the particular user group. It should be noted that, for example, at a position intermediate the positions A and B of FIG. 5, the observer's right eye observes only the first window 1 of the zeroth lobe, whereas the observer's left eye observes only the third window 3 of the zeroth lobe. As before, the unobserved windows are updated in anticipation of the observer moving to a position where they become observed.

The smaller window width allows a greater number of views to be displayed for a given lateral displacement of the observer. This is beneficial if the image data are also updated to give a "look around" effect.

FIGS. 6a and 6b compare the spatial extent of the viewing regions at which the autostereoscopic effect can be observed. In each figure the position Z represents the nominal window position of a display not incorporating an embodiment of the present invention. FIG. 6a indicates the viewing position for a multi-lobe display not having observer tracking. FIG. 6b shows the observer positions for a multi-lobe display incorporating lateral observer tracking. In each case, the ordinate represents the axis of display symmetry (i.e. mid-line of the display) and the shaded regions represent the area in which the autostereoscopic effect can be perceived.

The provision of lateral tracking also allows a modest increase in longitudinal freedom of position of the observer.

Embodiments of the present invention make it possible to produce a large field for autostereoscopic viewing. The image content displayed to the observer may also be made to vary with respect to observer position so as to give a "look around" (i.e. views containing parallax information) view to the observer.

Methods of tracking the observer's position may include magnetic, infrared, ultrasonic and video tracking. Tracking systems are known per se and need not be described here in detail.

FIG. 7 schematically illustrates an embodiment of the present invention. The display comprises a spatial light modulator 40, a lens 47 and an illumination source 41 comprising six light emitting elements arranged in pairs 42, 43, and 44. The lens 47 acts to form an image of the source 41 at the nominal viewing distance Z. Each pair of light emitting elements has the same inter-element distance as each other pair and the elements are arranged in a common plane. The pairs of light emitting elements are illuminated in sequence. Video information is supplied to the spatial light modulator in a time multiplexed manner in sequence with the successive illumination of each pair of illuminators. Such a display provides two lobes 45 and 46 each having three windows at the nominal viewing position Z. If the six light emitting elements are individually controllable, the display may be operated as a six window single lobe display to achieve the same freedom of movement.

FIG. 8 illustrates a further embodiment of the invention. A first light source 50 comprises three regularly spaced illuminators and is arranged to illuminate a first spatial light modulator 51 via a lens 52. Similarly, a second light source 54 comprises three regularly spaced illuminators and is arranged to illuminate a second spatial light modulator 55 via a lens 56. A similar arrangement is provided in respect of a third light source 57, a third lens 59 and a third spatial light modulator 58. A first beam combiner 60 combines the images of the first and second light sources 50 and 54, respectively, following modulation by their respective spatial light modulators. This combined image is further combined at a second beam combiner 62 with the image of the third light source 57 following modulation by the third spatial light modulator 58. The images are arranged to be laterally offset with respect to one another so as to provide an output of three lobes (labelled −1, 0 and +1) each comprising three windows. The windows form a substantially contiguous output at a nominal viewing position Z.

FIG. 9 schematically illustrates a further embodiment of the present invention. A back light 70 comprises three groups of light emitting elements. Elements belonging to the first group are labelled 71, elements belonging to the second group are labelled 72 and elements belonging to the third group are labelled 73. The light emitting elements are arranged in a repeating sequence of an element from the first group, an element from the second group and an element from the third group. Light from the light emitting elements is collected by an array of lenses 75 and is directed towards a nominal observer viewing position Z via a spatial light modulator 76. Each group of light emitting elements is illuminated in turn and the spatial light modulator is driven in a time multiplexed manner so as to present a different view to each one of the viewing windows.

FIG. 10 schematically illustrates a display constituting an embodiment of the present invention. A spatial light modulator 80 is sandwiched between first and second lenticular arrays 82 and 84. The first array 82 is adjacent the spatial light modulator 80 and has a pitch substantially equal to that of the spatial light modulator. The second lenticular array 84 has a pitch substantially twice that of the first lenticular array. A diffuser 86 is positioned intermediate the spatial light modulator 80 and the second lenticular screen 84. First and second light sources 88 and 90 are arranged to illuminate the first lenticular array 82 via a lens 92. The diffuser 86 is positioned such that an image of the light sources 88 and 90 is formed thereon following modulation by the spatial light modulator 80. The diffuser 86 also lies in an object plane of the second lenticular screen 84. The second lenticular screen 84 re-images the diffuser 86 at the nominal viewing position Z.

The light sources 88 and 90 and the spatial light modulator 80 are driven in a time multiplexed manner. When the first light source 88 is illuminated, a first modulating element 94 of the spatial light modulator 80 forms a modulated image at a position 95 on the diffuser 86 whereas a second element 96 of the spatial light modulator 80 forms an image at a position 97 on the diffuser 86. These positions are re-imaged as elements of window views 1 and 4 of each lobe. When the first illuminator 88 is extinguished and the second illuminator 90 is illuminated, the same modulating elements 94 and 96 form images at positions 98 and 99 respectively on the diffuser 86. These images form elements of windows 2 and 3 in each lobe. Such an embodiment combines both spatial and temporal multiplexing to provide a multi-lobe four view display.

FIG. 11 schematically illustrates a video multiplexing system for controlling the views displayed by the displays. Although three or four windows are provided, only left and right eye view information is required. Left eye view information is provided via a buffer 100 to left view inputs of first, second and third video switches 102, 104 and 106. Similarly right eye view information is provided via a buffer 108 to right eye inputs of the first, second and third video switches. Each video switch is responsible for selecting the video view to be provided to one of the display devices for display at one of the windows. Each video switch may control a respective display device or may be arranged to drive a single display in a multiplexed fashion, for example as shown in FIG. 7. Each video switch receives a control input from a controller 110 which selects whether the left view or right view should be displayed. The controller 110 is responsive to a tracking system 112 which determines the position of an observer. From a knowledge of the observer's position and the parameters of the display, the controller selects appropriate views and instructs the video switches to display the relevant left or right views. The switch points used by the controller 110 are determined generally by a calibration of the system, for instance by an observer moving to a defined optical position such as a window boundary and a measurement of the observer position being made. Alternatively, the controller 110 may be responsive to a manual control 111 which is manually operated by an observer as described hereinafter.

For a display using a lenticular screen, such as the display illustrated in FIG. 3, it is desirable that masked areas of the spatial light modulator should not be imaged as black bands which move as the observer moves. The arrangement of pixels as shown in FIG. 12 enables lateral gaps between the pixel group 120 and the pixel group 122 to be eliminated while still providing space for control lines within the display.

The display shown in FIG. 13 differs from that shown in FIG. 8 in that the light sources 50, 54, and 57 and the lenses 52, 56, and 59 are replaced by compact illuminators 50a, 54a, and 57a. The compact illuminator 50a comprises a lenticular screen 50b behind which is disposed a parallax barrier 50c. The parallax barrier 50c comprises a plurality of slits, each of which is aligned with a lenticule of the lenticular screen 50b. A Lambertian backlight 50d is disposed behind the parallax barrier 50c. The compact illuminators 54a and 57a are identical to the compact illuminator 50a.

Each lenticule of the lenticular screen 50b images the aligned slit of the parallax barrier 50c to the window of the zero lobe. In addition, the adjacent lenticules image the same slit to the same windows in the −1 and +1 lobes of the viewing windows. Accordingly, the display shown in FIG. 13 operates in the same way as that shown in FIG. 8 but can be made more compact.

FIG. 14 shows part of a display which differs from that shown in FIG. 3 in that the lenticular screen 22 is replaced by a parallax barrier 22a. The barrier 22a comprises a plurality of slits aligned with the pixels of the liquid crystal display 23 as shown in FIG. 14. A Lambertian backlight 50d is provided behind the liquid crystal display, whose pixels are contiguous with each other.

As shown in FIG. 14, each slit directs light along light cones to the first, second, and third windows of the zero lobe from the associated pixels. Further, the slits form +1 and −1 lobe windows such that the windows in each lobe are contiguous with each other and the lobes are contiguous with each other.

Although displays of the type shown in FIG. 14 having a "front" parallax barrier 22a produce a darker image, for a given level of illumination, compared with displays using lenticular screens, parallax barriers do not suffer from the optical aberrations of lenticular screens. In a front parallax barrier display, the quality of the windows, particularly in terms of the width of the boundary of each window, produced at the plane of an observer is controlled by the width of the slits. If the slits are made narrower, the geometric spreading of each window edge is reduced. However, the amount of diffraction occurring at the slit increases with decreasing width of each slit so that it is necessary to choose the width of the slits as a compromise between diffraction and geometric degradation effects.

FIG. 15 illustrates part of a display which differs from that shown in FIG. 14 in that the front parallax barrier 22a is replaced by a rear parallax barrier 22b disposed between the liquid crystal display 23 and the backlight 50d. A switchable diffuser 130 is provided between the barrier 22b and the display 23. The surface of the barrier 22b facing the backlight 50d is made reflective so that light which does not pass through the slits of the barrier 22b is reflected back to the backlight 50d for reuse. This improves the brightness of the displayed image.

The use of a rear parallax barrier 22b results in the geometric spreading of each window edge being controlled by the width of the slits of the parallax barrier whereas the diffraction spreading of the edges is controlled by the width of the pixels of the display 23. It is therefore possible to improve the quality of the window imaging compared with the display shown in FIG. 14 using the front parallax barrier.

The display may be used for two dimensional (2D) operation by switching the switchable diffuser 130 so as to diffuse light from the slits of the barrier 22b. The liquid crystal display 23 is then illuminated by a Lambertian source and 2D images are visible throughout a wide viewing range.

The rear parallax barrier 22b may be made as an array of transparent slits in an opaque mask. Alternatively, the barrier may be made by imaging a defined size light source through a lenticular screen on to a diffuser.

FIG. 16 illustrates diagrammatically an alternative technique for producing three or more contiguous windows by means of a hologram 131 comprising a plurality of holographic elements 132 associated with respective pixels of the spatial light modulator of the display and tuned for the appropriate colour filters of the pixels. Such holographic elements 132 are equivalent in operation to a lenticular screen or parallax barrier and, when appropriately illuminated for instance by a collimated white light reconstructing beam 133, each holographic element 132 produces a defined window for the associated colour. Each holographic element may be recorded so as to define several lobes as shown in FIG. 16. The holographic elements 132 are arranged in groups so that the light from each group of pixels is imaged to one of the three or more groups of windows as shown in FIG. 17. The intensity of the light is controlled by the pixel switching properties and the directionality by the hologram 131. An advantage of using holograms is that they are capable of providing significant improvements to the off-axis behaviour of the display because off-axis aberrations can be substantially cancelled when recording the holograms.

As shown in FIG. 18, the hologram 131 may be disposed inside a spatial light modulator 135 together with a liquid crystal layer 136 and a colour filter 137. Thus, the hologram is disposed substantially at the plane of the liquid crystal device forming the SLM 135, for instance by controlling the pattern of a black mask inside the pixel aperture. The hologram at each pixel can be tuned so as to direct light for the particular colour associated with the colour filter for that pixel to the appropriate window. This is indicated in FIG. 18 by abbreviations such that "W" refers to a window and "R", "G", and "B" refer to red, green, and blue light, respectively. Thus, the while light performance of the display may be improved. For instance, a light source for the display may contain three narrow spectral peaks which may be obtained by the appropriate choice of phosphors used in fluorescent tubes which, in combination with the colour filter and pixels, results in relatively small spectral spreading of the light from the holographic elements.

FIG. 19 shows an alternative arrangement in which the hologram 131 is disposed on the outer surface of the SLM 135. In this arrangement, by using collimated illumination, it is possible to make use of holograms formed in a photopolymer or dichromated gelatine or in the form of etched surface relief or embossed holograms. Alternatively, by controlling the structure of electrodes within each pixel of the SLM135, gratings may be created in the SLM.

The holograms 131 may be computer generated or may be recorded by interfering light from an illuminated window with a reference beam. For instance, a mask may be used to expose a recording plate at the first window of each lobe through a red colour filter together with a red reference beam. This may then be repeated for green and blue light. The process then may be repeated for each window and each corresponding holographic element.

FIG. 20 illustrates a compact collimated white backlight which may be used for illuminating the holograms 131. The backlight shown in FIG. 20 differs from that shown in FIG. 13 in that barriers 50e are arranged between elements of the lens array 50b and the lens array 50b is arranged to produce collimated light. The rear surface of the barrier 50c is made reflective so as to return unused light to the backlight illuminator 50d for reuse.

FIG. 21 shows a collimated backlight which differs from that shown in FIG. 20 in that the lens array 50b and the barrier 50e are replaced by small glass spheres 140 having a large packing density. As another alternative, it is possible to produce collimated light by means of an edge lit hologram.

It is thus possible to provide an observer tracking autostereoscopic display having no moving parts. Such a display is more robust and offers quicker response compared to a display incorporating moving parts. Such a display is also relatively insensitive to errors in the tracking of the observer.

The functions of a non-mechanical, electronic, lateral tracking method and a mechanical tracking method (for example, translating a parallax element, for example a parallax barrier or a lenticular screen with respect to an SLM or rotating a sandwich comprising at least a parallax element and an SLM in a flat panel type display) can be combined. It is thus possible to obtain good aberrational performance from the mechanical tracking method (the images of an observer's eye through the parallax element at the plane of the SLM are kept at or near the centre of the SLM pixels) as well as speed and extended viewing freedom from the non-mechanical tracking method. In this way, as an observer moves to a new position, a relatively slow mechanical system can either translate the parallax barrier or lenticular screen with respect to the SLM, or rotate the sandwich. Further, the non-mechanical tracking method working in conjunction with the mechanical tracking method allows the observer to maintain an autostereoscopic image throughout with extended viewing freedom which is not possible if only the mechanical method is used.

For a three window display, each lenticule 124 has a pitch substantially equal to that of three columns of pixels.

The display illustrated in FIG. 22 differs from that illustrated in FIG. 4 in that the sizes of the viewing windows are substantially equal to the average interocular separation. Further, the display is shown providing a look around facility comprising nine different views V1 to V9. This is an example of one possible configuration. The principle can also be applied to displays with more than three windows per lobe and with more than three lobes. The eye positions are illustrated with regard to their lateral positions but are actually located in the plane of the viewing windows. The lower part of FIG. 22 illustrates which view is being shown in each of the windows, an arrow indicating that, for the corresponding eye positions shown vertically thereabove, the view is being changed and is not visible to either eye.

With the eyes in the position illustrated at A, the windows 2 and 3 contain views V2 and V1, respectively. As the eyes move towards the position illustrated at B, the view V3 is entered in the window W1. There is some blurring of the window boundaries resulting from defocus, scatter and aberrations of a lenticular screen or because of the slit width of a parallax barrier so that, as an eye of an observer crosses a window boundary, the observer sees one view fade into the other, as illustrated in FIG. 23. Although there is substantial disparity between the adjacent viewing images, a smooth transition occurs as the eye moves across the boundary. In some circumstances, this has been found to be beneficial.

Because of the window boundary blurring and because the width of the windows is substantially equal to the average interocular separation, both eyes of the observer move across adjacent window boundaries substantially simultaneously. There is therefore a relatively course stepping of the views as the observer moves laterally across the window boundaries. However, the views are switched in the windows which are not currently visible to the observer in anticipation of the observer's eyes moving into the relevant window in the same way as described with reference to FIG. 4.

An advantage of the display illustrated in FIG. 22 is that it is less affected by optical errors, which can inhibit the performance of a true look-around type of display. Accordingly, lower performance and cheaper optical elements may be used and reduced accuracy in the tracking devices can be tolerated. Further, the use of larger windows allows larger viewpoint corrected zones to be provided thus giving the observer greater viewing freedom.

The display shown in FIG. 22 is not required to generate images as rapidly as for full look-around displays. Further, the response speed of the tracking system and an image generation system need not be as high as for a full look-around display.

For some applications, it is not necessary to provide a tracking system which automatically detects the position of the observer so as to switch views imperceptibly to the observer. For instance, the automatic tracking system may be replaced by a hand controller manually controlled by the observer so as to perform view switching to suit the current position of the observer. This allows the viewing freedom to be extended without requiring the complication and expense of an automatic observer tracking system. It is possible for an observer to become accustomed to switching the views in anticipation of moving to a new position. Although suitable for use with displays providing three windows in each lobe, the use of manual tracking with displays providing more than three windows per lobe may be beneficial as this reduces the number of times the observer has to update the display during movement.

The effect of blurring at the window boundaries may be enhanced by manipulation of the images supplied to the display. The blurring effect may be used in displays with two windows as well as in displays with more than three windows. In each case, blurring can serve to "wash out" the visibility of any errors in the display. Blurring may also be introduced by fading the image to monoscopic or to black at the boundary so that, although the boundary is still visible, any annoying artifacts of this are reduced.

Window boundary blurring may also be advantageous in displays of lower graphics performance. For instance, if the images cannot be updated sufficiently quickly, some window boundary blurring between adjacent images during look-around may be provided to reduce "flipping" artifacts in displays.

In order to avoid unpleasant visual artifacts outside the viewing region of the display, the light sources may be switched off when the observer is outside the viewing region. This may be performed not only for lateral movement outside the viewing region but also for vertical movement, both of which may be subject to the effects of aberrations in the optical elements. Instead of switching off the light source, it may be made to fade gradually as the observer approaches the edge of the viewing range.

In the case of manual switching of windows having a view in each window of the lobe, it may be possible for an observer to see a pseudoscopic image at the edge of the lobe if the windows are not switched at the appropriate time (e.g. by an inexperienced user). To avoid this possibility, it may be desirable to display a grey level (such as white) in the third window. The observer cannot then be confused during the switching process because, at the edge portions, the image will appear to turn a grey colour and then become 2D as one eye sees the grey window and the other eye sees the edge view.

Pressing buttons of the hand controller by the observer may be used to provide a position signal which is fed back to an image generation system. This may be used not only to ensure that the observer sees images in both eyes but also such that the images are adjusted for the particular viewing direction. For instance, in a computer game application, software may be configured to allow certain parts of the game to be performed only when the observer is in a particular position to the left of the display. Thus, a unique feature may be added to the game software with such a display.

FIG. 24 illustrates the use of a display of the type shown in FIG. 22 to perform such a function in combination with software for a computer game. Observer positions A, B and C are shown and FIGS. 25 to 27 illustrate the images which are visible from these positions for an example of a computer game. The observer uses the manual control 111 shown in FIG. 11 to indicate his position to software controlling the display, for instance controlling a microprocessor forming part of the controller 110 of FIG. 11.

When the observer uses the manual control 111 to indicate that he is located at observer position A, data representing this position are supplied to the computer game software which causes the display to provide appropriate images to appear in the windows where the observer eyes are located. FIG. 25 illustrates, purely by way of example, that a wall is visible to the observer when in the position A.

The observer may move to the position B and signal this to the controller 110 by means of the manual control 111. The controller 110 then causes the display to provide images at the windows where the observer is located giving a 3D image of the type shown in FIG. 26. Thus, the observer can see a sword 140 located "behind" the wall 141.

If the observer moves to the position C and signals this to the controller 110 by means of the manual control 111, the images change such that the observer then sees a 3D image of a game character 142 with whom the observer can interact by way of the manual control 111. For instance, the manual control 111 may have control buttons and the like for interfacing with the game software in addition to indicating the position of the observer.

What is claimed is:

1. An observer tracking autostereoscopic display comprising: at least three image displays arranged to direct respective images along different directions so as to define a pattern of at least three image regions at a nominal viewing distance; an observer tracker for detecting the position of an observer; and an image controller responsive to the observer tracker for updating the images displayed by the image displays such that the image displayed in an image region which is not visible to an observer is updated in anticipation of an observer eye moving into that image region and images displayed in image regions which are visible to the observer are not updated.

2. An autostereoscopic display as claimed in claim 1, wherein each of the image displays is arranged to repeat the respective image regions in a plurality of lobes.

3. An autostereoscopic display as claimed in claim 1, wherein adjacent pairs of the image regions are substantially contiguous.

4. An autostereoscopic display as claimed in claim 1, wherein the image displays are spatially multiplexed within a single display device.

5. An autostereoscopic display as claimed in claim 4, wherein the single display device is adjacent an array of parallax elements and is divided into repeating regions of N columns where N is the number of image displays, each region of N columns being adjacent a respective element or column of elements of the array.

6. An autostereoscopic display as claimed in claim 5, wherein the array of parallax elements comprises a lenticular screen.

7. An autostereoscopic display as claimed in claim 5, wherein the array of parallax elements comprises a parallax barrier.

8. An autostereoscopic display as claimed in claim 4, further comprising a hologram arranged to direct the images along the different directions.

9. An autostereoscopic display as claimed in claim 4, wherein the single display device is a spatial light modulator.

10. An autostereoscopic display as claimed in claim 4, wherein the single display device is an emissive display.

11. An autostereoscopic display as claimed in claim 1, wherein the image displays are spatial light modulators, each of which is illuminated by at least one light source, wherein images from which are combined by beam combiners.

12. An autostereoscopic display as claimed in claim 1, wherein the image displays are temporally multiplexed by a single spatial light modulator cooperating with at least three individually controllable light sources operated in a sequence.

13. An autostereoscopic display as claimed in claim 12, wherein each of the light sources comprises at least two light emitting regions.

14. An autostereoscopic display as claimed in claim 4, wherein the single display device is a spatial light modulator illuminated by at least two individually controllable light sources and arranged to operate in a time multiplexed manner in synchronism with the light sources.

15. An autostereoscopic display as claimed in claim 14, wherein the spatial light modulator is intermediate first and second arrays of parallax elements, the first array having a pitch substantially equal to a pixel pitch of the spatial light modulator and the second array having a pitch substantially equal to an integer multiple of the pitch of the first array.

16. An autostereoscopic display as claimed in claim 15, wherein the pitch of the second array is substantially twice the pitch of the first array.

17. An autostereoscopic display as claimed in claim 1, wherein the image within each of the image regions is inhibited from being updated when an eye of an observer is within a predetermined distance from the boundaries of that image region.

18. An autostereoscopic display as claimed in claim 1, comprising three images displays.

19. An autostereoscopic display as claimed in claim 1, wherein the image displays are arranged to produce each image region with a lateral size substantially equal to 2e/N, where e is an average interocular separation for a predefined observer group and N is the number of the image displays.

20. An autostereoscopic display as claimed in claim 19, wherein e is substantially equal to 65 millimetres.

21. An autostereoscopic display as claimed in claim 1, wherein the image displays are arranged to produce the image regions such that adjacent pairs of the images regions cross-fade spatially into each other.

22. An autostereoscopic display as claimed in claim 21, wherein the image displays are arranged to produce the image regions with a pitch substantially equal to an average interocular separation for a predefined observer group.

23. An autostereoscopic display as claimed in claim 22, wherein the pitch of the image regions is substantially equal to 65 millimetres.

24. A method of controlling an autostereoscopic display which provides a pattern of images in at least three image regions at a nominal viewing distance, the method comprising updating the image displayed in an image region which is not visible to an observer in anticipation of an observer eye moving into that image region and not updating the images displayed in image regions which are visible to the observer.

25. An autostereoscopic display as claimed in claim 1, wherein the image controller is arranged to permit different interactions with the display for different observer positions.

26. An autostereoscopic display as claimed in claim 25, wherein the different interactions include supplying different images to the different observer positions.

* * * * *